(12) United States Patent
Abe et al.

(10) Patent No.: US 8,530,080 B2
(45) Date of Patent: Sep. 10, 2013

(54) NONAQUEOUS ELECTROLYTE SOLUTION AND LITHIUM SECONDARY BATTERY USING SAME

(75) Inventors: Koji Abe, Yamaguchi (JP); Takaaki Kuwata, Yamaguchi (JP)

(73) Assignee: UBE Industries, Ltd., Ube-shi (JP)

( * ) Notice: Subject to any disclaimer, the term of this patent is extended or adjusted under 35 U.S.C. 154(b) by 0 days.

(21) Appl. No.: 13/618,644

(22) Filed: Sep. 14, 2012

(65) Prior Publication Data

US 2013/0052541 A1   Feb. 28, 2013

Related U.S. Application Data

(62) Division of application No. 12/791,085, filed on Jun. 1, 2010, now Pat. No. 8,440,349, which is a division of application No. 11/814,372, filed as application No. PCT/JP2006/300278 on Jan. 12, 2006, now Pat. No. 7,754,380.

(30) Foreign Application Priority Data

Jan. 20, 2005   (JP) ................. 2005-012728
Jan. 20, 2005   (JP) ................. 2005-012729

(51) Int. Cl.
 *H01M 6/14*   (2006.01)
(52) U.S. Cl.
 USPC ........... 429/199; 429/200; 429/330; 429/332; 429/188; 429/326; 429/231.1; 429/231.8; 429/231.4; 252/62.2
(58) Field of Classification Search
 USPC ............. 429/199, 200, 330, 332, 188, 326, 429/231.1, 231.8, 231.4; 252/62.2
 See application file for complete search history.

(56) References Cited

U.S. PATENT DOCUMENTS

| | | | |
|---|---|---|---|
| 6,479,191 B1 | 11/2002 | Hamamoto et al. | |
| 7,261,975 B2 | 8/2007 | Abe et al. | |
| 7,598,003 B1 | 10/2009 | Yoon et al. | |
| 7,695,863 B2 | 4/2010 | Abe et al. | |
| 7,727,677 B2 | 6/2010 | Abe et al. | |
| 7,754,380 B2 | 7/2010 | Abe et al. | |
| 7,794,876 B2 * | 9/2010 | Abe et al. ............. | 429/199 |
| 2004/0259000 A1 | 12/2004 | Adachi et al. | |
| 2005/0170254 A1 | 8/2005 | West et al. | |
| 2005/0214646 A1 | 9/2005 | Kubota | |
| 2005/0255384 A1 | 11/2005 | Abe et al. | |
| 2006/0035154 A1 | 2/2006 | West et al. | |
| 2006/0172201 A1 | 8/2006 | Yasukawa et al. | |
| 2008/0241704 A1 | 10/2008 | Abe et al. | |

FOREIGN PATENT DOCUMENTS

| | | |
|---|---|---|
| JP | 2001 256995 | 9/2001 |
| JP | 2001 313072 | 11/2001 |
| JP | 2002 100399 | 4/2002 |
| JP | 2002 110234 | 4/2002 |
| JP | 2002 124297 | 4/2002 |
| JP | 2003 059529 | 2/2003 |
| JP | 2003 272700 | 9/2003 |
| JP | 2003 272701 | 9/2003 |
| JP | 2003 297423 | 10/2003 |
| JP | 2005 190754 | 7/2005 |
| WO | WO 2005/029631 | 3/2005 |

* cited by examiner

*Primary Examiner* — Laura Weiner
(74) *Attorney, Agent, or Firm* — Oblon, Spivak, McClelland, Maier & Neustadt, L.L.P.

(57) ABSTRACT

A nonaqueous electrolytic solution that provides a lithium secondary battery with excellent electrical capacity, cycling properties, storage properties and other battery characteristics and that maintains the battery characteristics for a long time; and a lithium secondary battery comprising it. A nonaqueous electrolytic solution comprising an electrolytic salt dissolved in a nonaqueous solvent, containing 0.1 to 10% by weight of an ethylene carbonate derivative represented by the general formula (I), and 0.01 to 10% by weight of (A) a triple bond-containing compound and/or (B) a pentafluorophenyloxy compound represented by the general formula (X), wherein formula (I) is:

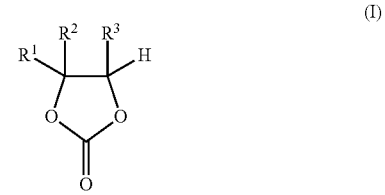

(I)

wherein $R^1$ to $R^3$ each independently represents a hydrogen atom, a halogen atom, an alkenyl group, an alkynyl group or an aryl group, provided that ethylene carbonate is excluded from the definition of the ethylene carbonate derivative; and wherein formula (X) is:

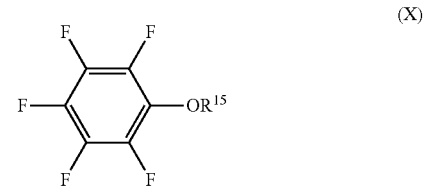

(X)

wherein $R^{15}$ represents an alkylcarbonyl group, an alkoxycarbonyl group, an aryloxycarbonyl group or an alkanesulfonyl group.

8 Claims, No Drawings

NONAQUEOUS ELECTROLYTE SOLUTION AND LITHIUM SECONDARY BATTERY USING SAME

CROSS-REFERENCE TO RELATED APPLICATIONS

This application is a divisional of U.S. Ser. No. 12/791,085 filed Jun. 1, 2010, now U.S. Pat. No. 8,440,349, which is a divisional of U.S. Ser. No. 11/814,372 filed Jul. 20, 2007, now U.S. Pat. No. 7,754,380, which is a National Stage of PCT/JP2006/300278 filed Jan. 12, 2006 and claims the benefit of JP 2005-012728 filed Jan. 20, 2005 and JP 2005-012729 filed Jan. 20, 2005.

TECHNICAL FIELD

The present invention relates to a nonaqueous electrolytic solution capable of forming a lithium secondary battery exhibiting excellent battery characteristics such as electrical capacity, cycle property and storage property, and to a lithium secondary battery using the nonaqueous electrolytic solution.

BACKGROUND ART

In recent years, lithium secondary batteries have been widely used as driving power supplies for small electronic devices and the like. Such lithium secondary batteries are mainly constituted of a positive electrode comprised of a lithium compound oxide, a negative electrode comprised of a carbon material or a lithium metal, and a nonaqueous electrolytic solution. As the nonaqueous electrolytic solution, a carbonate such as ethylene carbonate (EC) and propylene carbonate (PC) is used.

A lithium secondary battery using, for example, $LiCoO_2$, $LiMn_2O_4$ or $LiNiO_2$ as a positive electrode material brings about a reduction of the battery performance, when part of the solvent of the nonaqueous electrolytic solution locally undergoes an oxidative decomposition during the charging, because the decomposition products inhibit the desired electrochemical reaction of the battery. Such a reduction is considered to be attributed to an electrochemical oxidation of the solvent at the interface between the positive electrode material and the nonaqueous electrolytic solution.

Also, a lithium secondary battery using, for example, a highly crystallized carbon material, such as natural graphite and artificial graphite, as a negative electrode material brings about a reduction of the battery performance, when the solvent of the nonaqueous electrolytic solution undergoes a reductive decomposition on the surface of the negative electrode during the charging. Even in the case of EC which is widely generally used as a solvent for the nonaqueous electrolytic solution, a part thereof undergoes a reductive decomposition during repeated charging and discharging.

As techniques for improving the battery characteristics of such lithium secondary batteries, there are known, for example, Patent Documents 1 to 9.

Patent Document 1 discloses a nonaqueous electrolytic solution for a secondary battery composed of an electrolyte and a non aqueous solvent containing a cyclic carbonate having a nonconjugated unsaturated bond, such as vinylethylene carbonate (VEC), in an amount of 0.1 to 20% by weight based on the entire nonaqueous solvent and suggests an improvement of cycle life as its feature. The battery containing VEC, however, has a problem that a gas due to decomposition of the electrolytic solution is generated at the negative electrode in a larger amount as compared with a battery without VEC, thereby to cause a reduction of the battery performance.

Patent Document 2 discloses a lithium secondary battery using a mixture of an ethylene carbonate derivative, such as VEC and monofluoroethylene carbonate, and triphenyl phosphate. With such an electrolytic solution system, however, satisfactory cycle characteristics are not obtainable. Further, sufficient initial capacity and cycle characteristics cannot be obtained when the charge final voltage of the battery is higher (4.3 V or higher) than the conventional one.

Patent Documents 3 to 6 disclose a nonaqueous electrolytic solution for a lithium secondary battery containing an alkyne derivative.

Patent Document 7 discloses a coin-shaped battery as a lithium secondary battery containing a pentafluorobenzene compound, such as pentafluoroanisole, having an electron donating group. The coin-shaped battery, however, shows retention of capacity after 200 cycles of only about 80% and, therefore, has insufficient cycle property.

Patent Document 8 discloses that pentafluoroanisole is usable as an oxidation reduction reagent as chemical means for protecting a nonaqueous electrolytic solution secondary battery from overcharge but does not mention the cycle property thereof. Patent Document 9 discloses a nonaqueous electrolytic solution for a lithium secondary battery containing a pentafluorophenyloxy compound.

In these nonaqueous electrolytic solutions, the cycle property, etc. are improved in a certain degree. However, further improvement of battery performance is needed.

[Patent Document 1] Japanese Patent Application Publication 2000-40526
[Patent Document 2] U.S. Patent Application Publication 2003/157413
[Patent Document 3] Japanese Patent Application Publication 2000-195545
[Patent Document 4] Japanese Patent Application Publication 2001-313072
[Patent Document 5] Japanese Patent Application Publication 2002-100399
[Patent Document 6] Japanese Patent Application Publication 2002-124297
[Patent Document 7] U.S. Patent Application Publication 2002/110735
[Patent Document 8] Japanese Patent Application Publication H07-302614
[Patent Document 9] Japanese Patent Application Publication 2003-272700

DISCLOSURE OF THE INVENTION

It is an object of the present invention to provide a nonaqueous electrolytic solution having excellent battery characteristics such as electrical capacity, cycle property and storage property and capable of maintaining the excellent battery characteristics for a long time, and to provide a lithium secondary battery using the nonaqueous electrolytic solution.

The present inventors have found that incorporation of a specific ethylene carbonate derivative together with (A) a triple bond-containing compound and/or (B) a pentafluorophenyloxy compound into a nonaqueous electrolytic solution in a specific proportion can reduce generation of a gas and can maintain the battery performance such as cycle property for a long time, and have completed the present invention.

Thus, the present invention provides the following (1) and (2):

(1) A nonaqueous electrolytic solution for a lithium secondary battery, in which an electrolyte salt is dissolved in a nonaqueous solvent, comprising 0.1 to 10% by weight of an ethylene carbonate derivative represented by the following general formula (I):

[Formula 1]

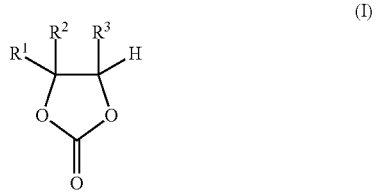

(I)

wherein $R^1$ to $R^3$ each independently represents a hydrogen atom, a halogen atom, a $C_2$ to $C_{12}$ alkenyl group, a $C_2$ to $C_{12}$ alkynyl group or a $C_6$ to $C_{18}$ aryl group, provided that ethylene carbonate is excluded from the definition of the ethylene carbonate derivative, and 0.01 to 10% by weight of (A) a triple bond-containing compound and/or (B) a pentafluorophenyloxy compound represented by the following general formula (X):

[Formula 2]

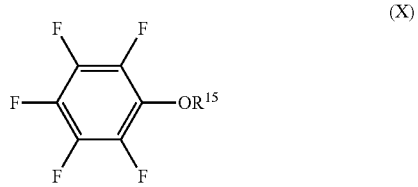

(X)

wherein $R^{15}$ represents a $C_2$ to $C_{12}$ alkylcarbonyl group, a $C_2$ to $C_{12}$ alkoxycarbonyl group, a $C_7$ to $C_{18}$ aryloxycarbonyl group or a $C_1$ to $C_{12}$ alkanesulfonyl group with the proviso that at least one of the hydrogen atoms of $R^{15}$ may be each substituted with a halogen atom or a $C_6$ to $C_{18}$ aryl group.

(2) A lithium secondary battery comprising a positive electrode, a negative electrode, and a nonaqueous electrolytic solution which includes an electrolyte salt dissolved in a nonaqueous solvent, wherein the nonaqueous electrolytic solution comprising 0.1 to 10% by weight of an ethylene carbonate derivative represented by the above general formula (I), and 0.01 to 10% by weight of (A) a triple bond-containing compound and/or (B) a pentafluorophenyloxy compound represented by the above general formula (X).

Since the nonaqueous electrolytic solution of the present invention is free of generation of a gas therein and liquid exhaustion phenomenon, the battery characteristics of the lithium secondary battery such as electrical capacity, cycle property and storage property can be improved and maintained for a long time.

The lithium secondary battery using the nonaqueous electrolytic solution of the present invention shows excellent battery characteristics such as electrical capacity, cycle property and storage property and can exhibit the excellent battery performance for a long time.

BEST MODE FOR CARRYING OUT THE INVENTION

The nonaqueous electrolytic solution for a lithium secondary battery according to the present invention, in which an electrolyte salt is dissolved in a nonaqueous solvent, is characterized in that the nonaqueous electrolytic solution comprises 0.1 to 10% by weight of an ethylene carbonate derivative represented by the following general formula (I) (hereinafter referred to simply as "the ethylene carbonate derivative") and 0.01 to 10% by weight of (A) a triple bond-containing compound and/or (B) a pentafluorophenyloxy compound represented by the following general formula (X) (hereinafter referred to simply as "the pentafluorophenyloxy compound").

It is considered that the conjoint use of the ethylene carbonate derivative and (A) the triple bond-containing compound and/or (B) the pentafluorophenyloxy compound permits the formation of a strong coating over a negative electrode, so that the decomposition of the solvent can be prevented and the battery characteristics such as electrical capacity, cycle property and storage property can be improved.

The ethylene carbonate derivative used in the present invention is represented by the following general formula (I):

[Formula 3]

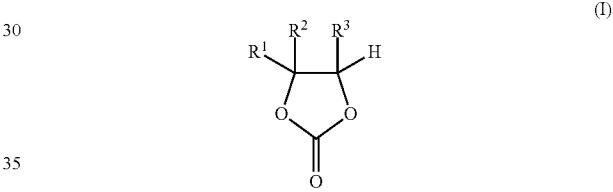

(I)

wherein $R^1$ to $R^3$ each independently represents a hydrogen atom, a halogen atom, a $C_2$ to $C_{12}$ alkenyl group, a $C_2$ to $C_{12}$ alkynyl group or a $C_6$ to $C_{18}$ aryl group, provided that ethylene carbonate is excluded from the definition of the ethylene carbonate derivative.

Examples of the halogen atom include a fluorine, chlorine, bromine and iodine atom. Of these atoms, fluorine and chlorine atoms are preferred. A fluorine atom is particularly preferred.

Examples of the $C_2$ to $C_{12}$ alkenyl group include a vinyl group, an allyl group and a crotyl group. A $C_2$ to $C_5$ alkenyl group is preferred. A vinyl group is particularly preferred.

Examples of suitable $C_2$ to $C_{12}$ alkynyl group include $C_2$ to $C_5$ alkynyl groups such as ethynyl group, 2-propynyl group, 3-butynyl group and 1-methyl-2-propynyl group.

Examples of $C_6$ to $C_{18}$ aryl group include a phenyl group, a tolyl group, a xylyl group and a naphthyl group.

Specific examples of the ethylene carbonate derivative include fluoroethylene carbonate (FEC), vinylethylene carbonate (VEC), 4,5-divinyl-1,3-dioxolan-2-one, 4-methyl-5-vinyl-1,3-dioxolan-2-one, 4-ethyl-5-vinyl-1,3-dioxolan-2-one, 4-propyl-5-vinyl-1,3-dioxolan-2-one, 4-butyl-5-vinyl-1,3-dioxolan-2-one, 4-pentyl-5-vinyl-1,3-dioxolan-2-one, 4-hexyl-5-vinyl-1,3-dioxolan-2-one, 4-phenyl-5-vinyl-1,3-dioxolan-2-one, 4,4-difluoro-1,3-dioxolan-2-one and 4,5-difluoro-1,3-dioxolan-2-one.

In the present specification, when isomers are possible, the compound may be used as either single isomer or as the combined mixture. The same applies to the rest of the specification.

Of these ethylene carbonate derivatives, at least one compound selected from FEC, VEC, 4,5-divinyl-1,3-dioxolan-2-one and 4,5-difluoro-1,3-dioxolan-2-one is preferred. Use of FEC and/or VEC is particularly preferred for reasons of improved charging and discharging characteristics and prevention of gas generation.

When the amount of the ethylene carbonate derivative contained in the nonaqueous electrolytic solution is excessively small, the desired battery performance may not be obtained. When excessively large, on the other hand, the battery performance is occasionally reduced. Thus, the amount is 0.1 to 10% by weight, preferably 0.5 to 5% by weight, more preferably 1 to 3% by weight, based on the weight of the nonaqueous electrolytic solution.

As the triple bond-containing compound used in the present invention, one or more alkyne derivatives represented by the following general formulas (II) to (VII) are preferable.

[Formula 4]

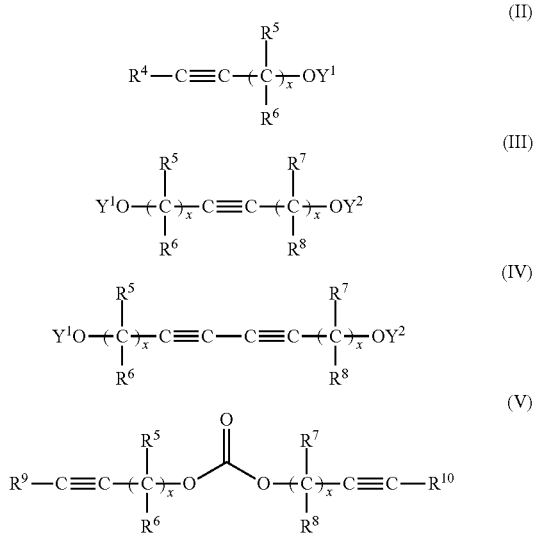

In the formulas (II) to (V), $R^4$ to $R^{10}$ each independently represents a hydrogen atom, a $C_1$ to $C_{12}$, preferably $C_1$ to $C_5$ alkyl group, a $C_3$ to $C_6$ cycloalkyl group or a $C_6$ to $C_{12}$ aryl group. $R^5$ and $R^6$, and $R^7$ and $R^8$ may be taken in combination to each other to represent a $C_3$ to $C_6$ cycloalkyl group. $Y^1$ and $Y^2$ may be the same or different and each represents —COOR$^{10}$, —COR$^{10}$ or SO$_2$R$^{10}$, and x represents an integer of 1 or 2.

[Formula 5]

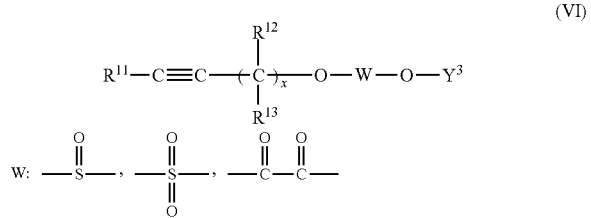

In the formula (VI), $R^{11}$ to $R^{13}$ each independently represents a hydrogen atom, a $C_1$ to $C_{12}$, preferably $C_1$ to $C_5$ alkyl group, a $C_3$ to $C_6$ cycloalkyl group, a $C_6$ to $C_{12}$ aryl group or a $C_7$ to $C_{12}$ aralkyl group, or $R^{12}$ and $R^{13}$ may be taken in combination to represent a $C_3$ to $C_6$ cycloalkyl group, W represents a sulfoxide group, a sulfone group or an oxalyl group, $Y^3$ represents a $C_1$ to $C_{12}$ alkyl, alkenyl or alkynyl group, a $C_3$ to $C_6$ cycloalkyl group, a $C_6$ to $C_{12}$ aryl group or a $C_7$ to $C_{12}$ aralkyl group, and x has the same meaning as above.

[Formula 6]

In the formula (VII), $R^4$ has the same meaning as above, $R^{14}$ represents a $C_1$ to $C_{12}$, preferably $C_1$ to $C_5$ alkyl group, a $C_3$ to $C_6$ cycloalkyl group or a $C_6$ to $C_{12}$ aryl group, and p represents an integer of 1 or 2.

Specific examples of the alkyne derivative represented by the general formula (II) in which $Y^1$=—COOR$^{10}$ and x=1 include 2-propynyl methyl carbonate [$R^4$ to $R^6$=H, $R^{10}$=methyl group], 1-methyl-2-propynyl methyl carbonate [$R^4$=$R^6$=H, $R^5$=$R^{10}$=methyl group], 2-propynyl ethyl carbonate [$R^4$ to $R^6$=H, $R^{10}$=ethyl group], 2-propynyl propyl carbonate [$R^4$ to $R^6$=H, $R^{10}$=propyl group], 2-propynyl butyl carbonate [$R^4$ to $R^6$=H, $R^{10}$=butyl group], 2-propynyl phenyl carbonate [$R^4$ to $R^6$=H, $R^{10}$=phenyl group], 2-propynyl cyclohexyl carbonate [$R^4$ to $R^6$=H, $R^{10}$=cyclohexyl group], 2-butynyl methyl carbonate [$R^4$=$R^{10}$=methyl group, $R^5$=$R^6$=H], 2-pentynyl methyl carbonate [$R^4$=ethyl group, $R^5$=$R^6$=H, $R^{10}$=methyl group], 1-methyl-2-butynyl methyl carbonate [$R^4$=$R^5$=methyl group, $R^6$=H, $R^{10}$=methyl group], 1,1-dimethyl-2-propynyl methyl carbonate [$R^4$=H, $R^5$=$R^6$=$R^{10}$=methyl group], 1,1-diethyl-2-propynyl methyl carbonate [$R^4$=H, $R^5$=$R^6$=ethyl group, $R^{10}$=methyl group], 1-ethyl-1-methyl-2-propynyl methyl carbonate [$R^4$=H, $R^5$=ethyl group, $R^6$=$R^{10}$=methyl group], 1-isobutyl-1-methyl-2-propynyl methyl carbonate [$R^4$=H, $R^5$=isobutyl group, $R^6$=$R^{10}$=methyl group], 1,1-dimethyl-2-butynyl methyl carbonate [$R^4$ to $R^{10}$=methyl group], 1-ethynylcyclohexyl methyl carbonate [$R^4$=H, $R^5$ and $R^6$ are bonded to represent a pentamethylene group, $R^{10}$=methyl group], 1-phenyl-1-methyl-2-propynyl methyl carbonate [$R^4$=H, $R^5$=phenyl group, $R^6$=$R^{10}$=methyl group], 1,1-diphenyl-2-propynyl methyl carbonate [$R^4$=H, $R^5$=$R^6$=phenyl group, $R^{10}$=methyl group] and 1,1-dimethyl-2-propynyl ethyl carbonate [$R^4$=H, $R^5$=$R^6$=methyl group, $R^{10}$=ethyl group].

Specific examples of the alkyne derivative represented by the general formula (II) in which $Y^1$=—COR$^{10}$ and x=1 include 2-propynyl formate [$R^4$ to $R^6$=$R^{10}$=H], 2-propynyl acetate [$R^4$ to $R^6$=H, $R^{10}$=methyl group], 1-methyl-2-propynyl formate [$R^4$=H, $R^5$=methyl group, $R^6$=$R^{10}$=H], 1-methyl-2-propynyl acetate [$R^4$=$R^6$=H, $R^5$=$R^{10}$=methyl group], 2-propynyl propionate [$R^4$ to $R^6$=H, $R^{10}$=ethyl group], 2-propynyl butyrate [$R^4$ to $R^6$=H, $R^{10}$=propyl group], 2-propynyl benzoate [$R^4$ to $R^6$=H, $R^{10}$=phenyl group], 2-propynyl cyclohexylcarboxylate [$R^4$ to $R^6$=H, $R^{10}$=cyclohexyl group], 2-butynyl formate [$R^4$=methyl group, $R^5$=$R^6$=$R^{10}$=H], 3-butynyl formate [$R^4$ to $R^6$=$R^{10}$=H], 2-pentynyl formate [$R^4$=ethyl group, $R^5$=$R^6$=$R^{10}$=H], 1-methyl-2-butynyl formate [$R^4$=$R^5$=$R^{10}$=methyl group, $R^6$=H], 1,1-dimethyl-2-propynyl formate [$R^4$=$R^{10}$=H, $R^5$=$R^6$=methyl group], 1,1-diethyl-2-propynyl formate [$R^4$=$R^{10}$=H, $R^5$=$R^6$=ethyl group], 1-ethyl-1-methyl-2-propynyl formate [$R^4$=$R^{10}$=H, $R^5$=ethyl group, $R^6$=methyl group], 1-isobutyl-1-methyl-2-propynyl formate [$R^4$=$R^{10}$=H, $R^5$=isobutyl group, $R^6$=methyl group], 1,1-dimethyl-2-butynyl formate [$R^4$ to $R^6$=methyl group, $R^{10}$=H], 1-ethynylcyclohexyl formate [$R^4$=$R^{10}$=H, $R^5$ and $R^6$ are bonded to represent a pentamethylene group], 1-phenyl-1-methyl-2-propynyl formate [$R^4$=$R^{10}$=H, $R^5$=phenyl group, $R^6$=methyl group], 1,1-diphenyl-2-propynyl formate [$R^4$=$R^{10}$=H, $R^5$=$R^6$=phenyl group], 2-butynyl acetate [$R^3$=$R^{10}$=methyl group, $R^4$=$R^5$=H], 2-pentynyl acetate [$R^4$=ethyl group, $R^5$=$R^6$=H, $R^{10}$=methyl group], 1-methyl-2-butynyl acetate [$R^4$=$R^5$=$R^{10}$=methyl group, $R^6$=H], 1,1-dimethyl-2-propynyl acetate [$R^4$=H, $R^5$=$R^6$=$R^{10}$=methyl group], 1,1-diethyl-2-propynyl acetate [$R^4$=H, $R^5$=$R^6$=ethyl group, $R^{10}$=methyl group], 1-ethyl-1-methyl-2-propynyl acetate [$R^4$=H, $R^5$=ethyl group, $R^6$=$R^{10}$=methyl group], 1-isobutyl-1-methyl-2-propynyl acetate [$R^4$=H, $R^5$=isobutyl group, $R^6$=$R^{10}$=methyl group], 1,1-dimethyl-2-butynyl acetate [$R^4$ to $R^6$=methyl group, $R^{10}$=methyl group], 1-ethynylcyclohexyl acetate [$R^4$=H, $R^5$ and $R^6$ are bonded to represent a pentamethylene group, $R^{10}$=methyl group], 1-phenyl-1-methyl-2-propynyl acetate [$R^4$=H, $R^5$=phenyl group, $R^6$=$R^{10}$=methyl group], 1,1-diphenyl-2-propynyl acetate [$R^4$=H, $R^5$=$R^6$=phenyl group, $R^{10}$=methyl group] and 1,1-dimethyl-2-propynyl propionate [$R^4$=H, $R^5$=$R^6$=methyl group, $R^{10}$=ethyl group].

Specific examples of the alkyne derivative represented by the general formula (II) in which $Y^1$=—$SO_2R^{10}$ and x=1 include 2-propynyl methanesulfonate [$R^4$ to $R^6$=H, $R^{10}$=methyl group], 1-methyl-2-propynyl methanesulfonate [$R^4$=$R^6$=H, $R^5$=$R^{10}$=methyl group], 2-propynyl ethanesulfonate [$R^4$ to $R^6$=H, $R^{10}$=ethyl group], 2-propynyl propanesulfonate [$R^4$ to $R^6$=H, $R^{10}$=propyl group], 2-propynyl p-toluenesulfonate [$R^4$ to $R^6$=H, $R^{10}$=p-tolyl group], 2-propynyl cyclohexylsulfonate [$R^4$ to $R^6$=H, $R^{10}$=cyclohexyl group], 2-butynyl methanesulfonate [$R^4$=$R^{10}$=methyl group, $R^5$=$R^6$=H], 2-pentynyl methanesulfonate [$R^4$=ethyl group, $R^5$=$R^6$=H, $R^{10}$=methyl group], 1-methyl-2-butynyl methanesulfonate [$R^4$=$R^5$=$R^{10}$=methyl group, $R^6$=H], 1,1-dimethyl-2-propynyl methanesulfonate [$R^4$=H, $R^5$=$R^6$=$R^{10}$=methyl group], 1,1-diethyl-2-propynyl methanesulfonate [$R^4$=H, $R^5$=$R^6$=ethyl group, $R^{10}$=methyl group], 1-ethyl-1-methyl-2-propynyl methanesulfonate [$R^4$=H, $R^5$=ethyl group, $R^6$=$R^{10}$=methyl group], 1-isobutyl-1-methyl-2-propynyl methanesulfonate [$R^4$=H, $R^5$=isobutyl group, $R^6$=$R^{10}$=methyl group], 1,1-dimethyl-2-butynyl methanesulfonate [$R^4$ to $R^6$=$R^{10}$=methyl group], 1-ethynylcyclohexyl methanesulfonate [$R^4$=H, $R^5$ and $R^6$ are bonded to represent a pentamethylene group, $R^{10}$=methyl group], 1-phenyl-1-methyl-2-propynyl methanesulfonate [$R^4$=H, $R^5$=phenyl group, $R^6$=$R^{10}$=methyl group], 1,1-diphenyl-2-propynyl methanesulfonate [$R^4$=H, $R^5$=$R^6$=phenyl group, $R^{10}$=methyl group] and 1,1-dimethyl-2-propynyl ethanesulfonate [$R^4$=H, $R^5$=$R^6$=methyl group, $R^{10}$=ethyl group].

Specific examples of the alkyne derivative represented by the general formula (II) in which x=2 include 3-butynyl methyl carbonate [$R^4$ to $R^6$=H, $Y^1$=—$COOCH_3$], 3-butynyl acetate [$R^4$ to $R^6$=H, $Y^1$=—$COCH_3$] and 3-butynyl methanesulfonate [$R^4$ to $R^6$=H, $Y^1$=—$SO_2CH_3$].

Above all, at least one alkyne derivative selected from 2-propynyl methyl carbonate, 2-propynyl ethyl carbonate, 2-propynyl propyl carbonate, 2-propynyl formate, 2-butynyl formate, 2-propynyl acetate, 2-propynyl methanesulfonate and 1-methyl-2-propynyl methanesulfonate is preferred. Particularly preferred is at least one alkyne derivative selected from 2-propynyl methyl carbonate, 2-propynyl formate and 2-propynyl methanesulfonate.

Specific examples of the alkyne derivative represented by the general formula (III) in which $Y^1$=$Y^2$=—$COOR^{10}$ and x=1 include 2-butyne-1,4-diol dimethyl dicarbonate [$R^5$ to $R^8$=H, $R^{10}$=methyl group], 2-butyne-1,4-diol diethyl dicarbonate [$R^5$ to $R^8$=H, $R^{10}$=ethyl group], 3-hexyne-2,5-diol dimethyl dicarbonate [$R^5$=$R^7$=$R^{10}$=methyl group, $R^6$=$R^8$=H], 3-hexyne-2,5-diol diethyl dicarbonate [$R^5$=$R^7$=methyl group, $R^6$=$R^8$=H, $R^{10}$=ethyl group], 2,5-dimethyl-3-hexyne-2,5-diol dimethyl dicarbonate [$R^5$ to $R^8$=$R^{10}$=methyl group] and 2,5-dimethyl-3-hexyne-2,5-diol diethyl dicarbonate [$R^5$ to $R^8$=methyl group, $R^{10}$=ethyl group]

Specific examples of the alkyne derivative represented the general formula (III) in which $Y^1$=$Y^2$=—$COR^{10}$ and x=1 include 2-butyne-1,4-diol diformate [$R^5$ to $R^8$=$R^{10}$=H], 2-butyne-1,4-diol diacetate [$R^5$ to $R^8$=H, $R^{10}$=methyl group], 2-butyne-1,4-diol dipropionate [$R^5$ to $R^8$=H, $R^{10}$=ethyl group], 3-hexyne-2,5-diol diformate [$R^5$=$R^7$=methyl group, $R^6$=$R^8$=$R^{10}$=H], 3-hexyne-2,5-diol diacetate [$R^5$=$R^7$=$R^{10}$=methyl group, $R^6$=$R^8$=H], 3-hexyne-2,5-diol dipropionate [$R^5$=$R^7$=methyl group, $R^6$=$R^8$=H, $R^{10}$=ethyl group], 2,5-dimethyl-3-hexyne-2,5-diol diformate [$R^5$ to $R^8$=methyl group, $R^{10}$=H], 2,5-dimethyl-3-hexyne-2,5-diol diacetate [$R^5$ to $R^8$=$R^{10}$=methyl group] and 2,5-dimethyl-3-hexyne-2,5-diol dipropionate [$R^5$ to $R^8$=methyl group, $R^{10}$=ethyl group].

Specific examples of the alkyne derivative represented by the general formula (III) in which $Y^1$=$Y^2$=—$SO_2R^{10}$ and x=1 include 2-butyne-1,4-diol dimethanesulfonate [$R^5$ to $R^8$=H, $R^{10}$=methyl group], 2-butyne-1,4-diol diethanesulfonate [$R^5$ to $R^8$=H, $R^{10}$=ethyl group], 3-hexyne-2,5-diol dimethanesulfonate [$R^5$=$R^7$=$R^{10}$=methyl group, $R^6$=$R^8$=H], 3-hexyne-2,5-diol diethanesulfonate [$R^5$=$R^7$=methyl group, $R^6$=$R^8$=H, $R^{10}$=ethyl group], 2,5-dimethyl-3-hexyne-2,5-diol dimethanesulfonate [$R^5$ to $R^8$=$R^{10}$=methyl group] and 2,5-dimethyl-3-hexyne-2,5-diol diethanesulfonate [$R^5$ to $R^8$=methyl group, $R^{10}$=ethyl group]

Of the alkyne derivatives represented by the general formula (III), at least one alkyne derivative selected from 2-butyne-1,4-diol dimethyl carbonate, 2-butyne-1,4-diol diethyl carbonate, 3-hexyne-2,5-diol dimethyl dicarbonate, 2,5-dimethyl-3-hexyne-2,5-diol dimethyl dicarbonate, 2-butyne-1,4-diol diacetate, 2-butyne-1,4-diol diformate, 3-hexyne-2,5-diol diformate, 2,5-dimethyl-3-hexyne-2,5-diol diformate, 2-butyne-1,4-diol dimethanesulfonate, 3-hexyne-2,5-diol dimethanesulfonate and 2,5-dimethyl-3-hexyne-2,5-diol dimethanesulfonate is preferred.

Particularly preferred is at least one alkyne derivative selected from 2-butyne-1,4-diol dimethyl carbonate, 2-butyne-1,4-diol diformate and 2-butyne-1,4-diol dimethanesulfonate.

Specific examples of the alkyne derivative represented by the general formula (IV) in which $Y^1$=$Y^2$=—$COOR^{10}$ and x=1 include 2,4-hexadiyne-1,6-diol dimethyl dicarbonate [$R^5$ to $R^8$=H, $R^{10}$=methyl group], 2,4-hexadiyne-1,6-diol diethyl dicarbonate [$R^5$ to $R^8$=H, $R^{10}$=ethyl group], 2,7-dimethyl-3,5-octadiyne-2,7-diol dimethyl dicarbonate [$R^5$ to $R^8$=$R^{10}$=methyl group] and 2,7-dimethyl-3,5-octadiyne-2,7-diol diethyl dicarbonate [$R^5$ to $R^8$=methyl group, $R^{10}$=ethyl group].

Specific examples of the alkyne derivative represented by the general formula (IV) in which $Y^1$=$Y^2$=—$COR^{10}$ and x=1 include 2,4-hexadiyne-1,6-diol diacetate [$R^5$ to $R^8$=H, $R^{10}$=methyl group], 2,4-hexadiyne-1,6-diol dipropionate [$R^5$ to $R^8$=H, $R^{10}$=ethyl group], 2,7-dimethyl-3,5-octadiyne-2,7-diol diacetate [$R^5$ to $R^8$=methyl group, $R^{10}$=methyl group] and 2,7-dimethyl-3,5-octadiyne-2,7-diol dipropionate [$R^5$ to $R^8$=methyl group, $R^{10}$=ethyl group].

Specific examples of the alkyne derivative represented by the general formula (IV) in which $Y^1$=$Y^2$=—$SO_2R^{10}$ and x=1 include 2,4-hexadiyne-1,5-diol dimethanesulfonate [$R^5$ to $R^8$=H, $R^{10}$=methyl group], 2,4-hexadiyne-1,6-diol diethanesulfonate [$R^5$ to $R^8$=H, $R^{10}$=ethyl group], 2,7-dimethyl-3,5-octadiyne-2,7-diol dimethanesulfonate [$R^5$ to $R^8$=$R^{10}$=methyl group] and 2,7-dimethyl-3,5-octadiyne-2,7-diol diethanesulfonate [$R^5$ to $R^8$=methyl group, $R^{10}$=ethyl group].

Of the alkyne derivatives represented by the general formula (IV), at least one alkyne derivative selected from 2,4-hexadiyne-1,6-diol dimethyl dicarbonate, 2,4-hexadiyne-1,6-diol diacetate and 2,4-hexadiyne-1,6-diol dimethanesulfonate is preferred.

Specific examples of the alkyne derivative represented by the general formula (V) in which x=1 include dipropargyl carbonate [$R^5$ to $R^{10}$=H], di(1-methyl-2-propynyl)carbonate [$R^5$=$R^7$=methyl group, $R^6$=$R^8$ to $R^{10}$=H], di(2-butynyl)carbonate [$R^5$ to $R^8$=H, $R^9$=$R^{10}$=methyl group], di(2-pentynyl)carbonate [$R^5$ to $R^8$=H, $R^9$=$R^{10}$=ethyl group], di(1-methyl-2-butynyl)carbonate [$R^5$=$R^6$=$R^9$=$R^{10}$=methyl group, $R^7$=$R^8$=H], 2-propynyl 2-butynyl carbonate [$R^5$ to $R^9$=H, $R^{10}$=methyl group], di(1,1-dimethyl-2-propynyl)carbonate [$R^5$ to $R^8$=methyl group, $R^9$=$R^{10}$=H], di(1,1-diethyl-2-propynyl)carbonate [$R^5$ to $R^8$=ethyl group, $R^9$=$R^{10}$=H], di(1-ethyl-1-methyl-2-propynyl)carbonate [$R^5$=$R^7$=ethyl group, $R^6$=$R^8$=methyl group, $R^9$=$R^{10}$=H], di(1-isobutyl-1-methyl-2-propynyl)carbonate [$R^5$=$R^7$=isobutyl group, $R^6$=$R^8$=methyl group, $R^9$=$R^{10}$=H], di(1,1-dimethyl-2-butynyl)carbonate [$R^5$ to $R^{10}$=methyl group] and di(1-ethynylcyclohexyl)carbonate [$R^5$ and $R^6$ are bonded to represent a pentamethylene group, $R^7$ and $R^8$ are bonded to represent pentamethylene group, $R^9$=$R^{10}$=H].

Specific examples of the alkyne derivative represented by the general formula (V) in which x=2 include di(3-butynyl)carbonate [$R^5$ to $R^{10}$=H].

Of the alkyne derivatives represented by the general formula (V), at least one alkyne derivative selected from dipropargyl carbonate, di(1-methyl-2-propynyl)carbonate and di(2-butynyl)carbonate is preferred.

Specific examples of the alkyne derivative represented by the general formula (VI) in which W represents a sulfoxide group and x=1 include di(2-propynyl)sulfite [$R^{11}$ to $R^{13}$=H, $Y^3$=2-propynyl group], di(1-methyl-2-propynyl)sulfite [$R^{11}$=H, $R^{12}$=methyl group, $R^{13}$=H, $Y^3$=1-methyl-2-propynyl group], di(2-butynyl)sulfite [$R^{11}$=methyl group, $R^{12}$=$R^{13}$=H, $Y^3$=2-butynyl group], di(2-pentynyl)sulfite [$R^{11}$=ethyl group, $R^{12}$=$R^{13}$=H, $Y^3$=2-pentynyl group], di(1-methyl-2-butynyl)sulfite [$R^{11}$=$R^{12}$=methyl group, $R^{13}$=H, $Y^3$=1-methyl-2-butynyl group], di(1,1-dimethyl-2-propynyl)sulfite [$R^{11}$=H, $R^{12}$=$R^{13}$=methyl group, $Y^3$=1,1-dimethyl-2-propynyl group], di(1,1-diethyl-2-propynyl)sulfite [$R^{11}$=H, $R^{12}$=$R^{13}$=ethyl group, $Y^3$=1,1-diethyl-2-propynyl group], di(1-ethyl-1-methyl-2-propynyl)sulfite [$R^{11}$=H, $R^{12}$=ethyl group, $R^{13}$=methyl group, $Y^3$=1-ethyl-1-methyl-2-propynyl group], di(1-isobutyl-1-methyl-2-propynyl)sulfite [$R^{11}$=H, $R^{12}$=isobutyl group, $R^{13}$=methyl group, $Y^3$=1-isobutyl-1-methyl-2-propynyl group], di(1,1-dimethyl-2-butynyl)sulfite [$R^{11}$=$R^{12}$=$R^{13}$=methyl group, $Y^3$=1,1-dimethyl-2-butynyl group], di(1-ethynylcyclohexyl)sulfite [$R^{11}$=H, $R^{12}$ and $R^{13}$ are combined to represent pentamethylene group, $Y^3$=1-ethynylcyclohexyl group], di(1-methyl-1-phenyl-2-propynyl)sulfite [$R^{11}$=H, $R^{12}$=phenyl group, $R^{13}$=methyl group, $Y^3$=1-methyl-1-phenyl-2-propynyl group], di(1,1-diphenyl-2-propynyl)sulfite [$R^{11}$=H, $R^{12}$=$R^{13}$=phenyl group, $Y^3$=1,1-diphenyl-2-propynyl group], methyl 2-propynyl sulfite [$R^{11}$ to $R^{13}$=H, $Y^3$=methyl group], methyl 1-methyl-2-propynyl sulfite [$R^{11}$=H, $R^{12}$=methyl group, $R^{13}$=H, $Y^3$=methyl group], ethyl 2-propynyl sulfite [$R^{11}$ to $R^{13}$=H, $Y^3$=ethyl group], phenyl 2-propynyl sulfite [$R^{11}$ to $R^{13}$=H, $Y^3$=phenyl group] and cyclohexyl 2-propynyl sulfite [$R^{11}$ to $R^{13}$=H, $Y^3$=cyclohexyl group].

Specific examples of the alkyne derivative represented by the general formula (VI) in which W represents a sulfoxide group and x=2 include di(3-butynyl)sulfite [$R^{11}$ to $R^{13}$=H, $Y^3$=3-butynyl group].

Of the alkyne derivatives represented by the general formula (VI), at least one alkyne derivative selected from di(2-propynyl)sulfite, di(1-methyl-2-propynyl)sulfite, di(2-butynyl)sulfite, methyl 2-propynyl sulfite, methyl 1-methyl-2-propynyl sulfite and ethyl 2-propynyl sulfite is preferred. Particularly preferred is at least one of di(2-propynyl)sulfite, methyl-2-propynyl sulfite and ethyl 2-propynyl sulfite.

Specific examples of the alkyne derivative of the general formula (VI) in which W represents a sulfone group and x=1 include di(2-propynyl)sulfate [$R^{11}$ to $R^{13}$=H, $Y^3$=2-propynyl group], di(1-methyl-2-propynyl)sulfate [$R^{11}$=$R^{13}$=H, $R^{12}$=methyl group, $Y^3$=1-methyl-2-propynyl group], di(2-butynyl)sulfate [$R^{11}$=methyl group, $R^{12}$=$R^{13}$=H, $Y^3$=2-butynyl group], di(2-pentynyl)sulfate [$R^{11}$=ethyl group, $R^{13}$=H, $Y^3$=2-pentynyl group], di(1-methyl-2-butynyl)sulfate [$R^{11}$=$R^{13}$=H, $R^{12}$=methyl group, $R^{13}$=H, $Y^3$=1-methyl-2-butynyl group], di(1,1-dimethyl-2-propynyl)sulfate [$R^{11}$=H, $R^{12}$=$R^{13}$=methyl group, $Y^3$=1,1-dimethyl-2-propynyl group], di(1,1-diethyl-2-propynyl)sulfate [$R^{11}$=H, $R^{12}$=$R^{13}$=ethyl group, $Y^3$=1,1-diethyl-2-propynyl group], di(1-ethyl-1-methyl-2-propynyl)sulfate [$R^{11}$=H, $R^{12}$=ethyl group, $R^{13}$=methyl group, $Y^3$=1-ethyl-1-methyl-2-propynyl group], di(1-isobutyl-1-methyl-2-propynyl)sulfate [$R^{11}$=H, $R^{12}$=isobutyl group, $R^{13}$=methyl group, $Y^3$=1-isobutyl-1-methyl-2-propynyl group], di(1,1-dimethyl-2-butynyl)sulfate [$R^{11}$ to $R^{13}$=methyl group, $Y^3$=1,1-dimethyl-2-butynyl group], di(1-ethynylcyclohexyl)sulfate [$R^{11}$=H, $R^{12}$ and $R^{13}$ are bonded to represent a pentamethylene group, $Y^3$=1-ethynylcyclohexyl group], di(1-methyl-1-phenyl-2-propynyl)sulfate [$R^{11}$=H, $R^{12}$=phenyl group, $R^{13}$=methyl group, $Y^3$=1-methyl-1-phenyl-2-propynyl group], di(1,1-diphenyl-2-propynyl)sulfate [$R^{11}$=H, $R^{12}$=$R^{13}$=phenyl group, $Y^3$=1,1-diphenyl-2-propynyl group], methyl 2-propynyl sulfate [$R^{11}$ to $R^{13}$=H, $Y^3$=methyl group], methyl 1-methyl-2-propynyl sulfate [$R^{11}$=$R^{13}$=H, $R^{12}$=methyl group, $Y^3$=methyl group], ethyl 2-propynyl sulfate [$R^{11}$ to $R^{13}$=H, $Y^3$=ethyl group], phenyl 2-propynyl sulfate [$R^{11}$ to $R^{13}$=H, $Y^3$=phenyl group] and cyclohexyl 2-propynyl sulfate [$R^{11}$ to $R^{13}$=H, $Y^3$=cyclohexyl group].

Specific examples of the alkyne derivative represented by the general formula (VI) in which W represents a sulfone group and x=2 include di(3-butynyl)sulfate [$R^{11}$ to $R^{13}$=H, $Y^3$=3-butynyl group].

Of the alkyne derivatives represented by the general formula (VI), at least one alkyne derivative selected from di(2-propynyl)sulfate, di(1-methyl-2-propynyl)sulfate, methyl 2-propynyl sulfate, and ethyl 2-propynyl sulfate is preferred.

Specific examples of the alkyne derivative of the general formula (VI) in which W represents an oxalyl group and x=1 include di(2-propynyl)oxalate [$R^{11}$ to $R^{13}$=H, $Y^3$=2-propynyl group], di(1-methyl-2-propynyl)oxalate [$R^{11}$=$R^{13}$=H, $R^{12}$=methyl group, $Y^3$=1-methyl-2-propynyl group], di(2-butynyl)oxalate [$R^{11}$=methyl group, $R^{12}$=$R^{13}$=H, $Y^3$=2-butynyl group], di(2-pentynyl)oxalate [$R^{11}$=ethyl group, $R^{12}$=$R^{13}$=H, $Y^3$=2-pentynyl group], di(1-methyl-2-butynyl)oxalate [$R^{11}$=$R^{12}$=methyl group, $R^{13}$=H, $Y^3$=1-methyl-2-butynyl group], di(1,1-dimethyl-2-propynyl)oxalate [$R^{11}$=H, $R^{12}$=$R^{13}$=methyl group, $Y^3$=1,1-dimethyl-2-propynyl group], di(1,1-diethyl-2-propynyl)oxalate [$R^{11}$=H, $R^{12}$=$R^{13}$=ethyl group, $Y^3$=1,1-diethyl-2-propynyl group], di(1-ethyl-1-methyl-2-propynyl)oxalate [$R^{11}$=H, $R^{12}$=ethyl group, $R^{13}$=methyl group, $Y^3$=1-ethyl-1-methyl-2-propynyl group], di(1-isobutyl-1-methyl-2-propynyl)oxalate [$R^{11}$=H, $R^{12}$=isobutyl group, $R^{13}$=methyl group, $Y^3$=1-isobutyl-1-methyl-2-propynyl group], di(1,1-dimethyl-2-butynyl)oxalate [$R^{11}$ to $R^{13}$=methyl group, $Y^3$=1,1-dimethyl-2-butynyl group], di(1-ethynylcyclohexyl)oxalate [$R^{11}$=H, $R^{12}$ and $R^{13}$ are bonded to represent a pentamethylene group, $Y^3$=1-ethynylcyclohexyl group], di(1-methyl-1-phenyl-2-propynyl)oxalate [$R^{11}$=H, $R^{12}$=phenyl group, $R^{13}$=methyl group, $Y^3$=1-methyl-1-phenyl-2-propynyl group], di(1,1-diphenyl-2-propynyl)oxalate [$R^{11}$=H, $R^{12}$=$R^{13}$=phenyl group, $Y^3$=1,1-diphenyl-2-propynyl group], methyl 2-propynyl oxalate [$R^{11}$ to $R^{13}$=H, $Y^3$=methyl group], methyl 1-methyl-2-propynyl oxalate [$R^{11}$=H, $R^{12}$=methyl group, $R^{13}$=H, $Y^3$=methyl group], ethyl 2-propynyl oxalate [$R^{11}$ to $R^{13}$=H, $Y^3$=ethyl group], ethyl 1-methyl-2-propynyl oxalate [$R^{11}$=$R^{13}$=H, $R^{12}$=methyl group, $Y^3$=ethyl group], phenyl 2-propynyl oxalate [$R^{11}$ to $R^{13}$=H, $Y^3$=phenyl group] and cyclohexyl 2-propynyl oxalate [$R^{11}$ to $R^{13}$=H, $Y^3$=cyclohexyl group].

Specific examples of the alkyne derivative represented by the general formula (VI) in which W represents an oxalyl group and x=2 include di(3-butynyl)oxalate [$R^{11}$ to $R^{13}$=H, $Y^3$=3-butynyl group].

Of the alkyne derivatives represented by the general formula (VI), at least one alkyne derivative selected from di(2-propynyl)oxalate, di(1-methyl-2-propynyl)oxalate, methyl 2-propynyl oxalate, ethyl 2-propynyl oxalate, methyl 1-methyl-2-propynyl oxalate and ethyl 1-methyl-2-propynyl oxalate is preferred. Particularly preferred is at least one of di(2-propynyl)oxalate, methyl-2-propynyl oxalate and ethyl 2-propynyl oxalate.

Specific examples of the alkyne derivative represented by the general formula (VII) in which p=1 include 2-pentyne [$R^4$=methyl group, $R^{14}$=ethyl group], 1-hexyne [$R^4$=butyl group, $R^{14}$=H], 2-hexyne [$R^4$=propyl group, $R^{14}$=methyl group], 3-hexyne [$R^4$=$R^{14}$=ethyl group], 1-heptyne [$R^4$=pentyl group, $R^{14}$=H], 1-octyne [$R^4$=hexyl group, $R^{14}$=H], 2-octyne [$R^4$=methyl group, $R^{14}$=pentyl group], 4-octyne [$R^4$=$R^{14}$=propyl group], 1-decyne [$R^4$=octyl group, $R^{14}$=H], 1-dodecyne [$R^4$=decyl group, $R^{14}$=H], phenylacetylene [$R^4$=phenyl group, $R^{14}$=H], 1-phenyl-1-propyne [$R^4$=phenyl group, $R^{14}$=methyl group], 1-phenyl-1-butyne [$R^4$=phenyl group, $R^{14}$=ethyl group], 1-phenyl-1-pentyne [$R^4$=phenyl group, $R^{14}$=propyl group], 1-phenyl-1-hexyne [$R^4$=phenyl group, $R^{14}$=butyl group], diphenylacetylene [$R^4$=$R^{14}$=phenyl group], 4-ethynyltoluene [$R^4$=p-tolyl group, $R^{14}$=H], 4-tert-butylphenylacetylene [$R^4$=4-tert-butylphenyl group, $R^{14}$=H], 1-ethynyl-4-fluorobenzene [$R^4$=p-fluorophenyl group, $R^{14}$=H], 1,4-diethynylbenzene [$R^4$=p-ethynylphenyl group, $R^{14}$=H] and dicyclohexylacetylene [$R^4$=$R^{14}$=cyclohexyl group].

Specific examples of the alkyne derivative represented by the general formula (VII) in which p=2 include 1,4-diphenylbutadiyne [$R^4$=$R^{14}$=phenyl group].

Of the alkyne derivatives represented by the general formula (VII), at least one alkyne derivative selected from phenylacetylene, 1-phenyl-1-propyne, 1-phenyl-1-butyne, diphenylacetylene, 4-ethynyltoluene, 1-ethynyl-4-fluorobenzene and 1,4-diethynylbenzene. Particularly preferred are phenylacetylene and/or 1-phenyl-1-propyne.

Of the above-described alkyne derivatives, the most preferred compound is at least one compound selected from 2-propynyl methyl carbonate, 2-propynyl methanesulfonate (compounds represented by the general formula (II)), 2-butyne-1,4-diol dimethyl carbonate, 2-butyne-1,4-diol diformate, 2-butyne-1,4-diol dimethanesulfonate (compounds represented by the general formula (III)), di(2-propynyl) sulfite, methyl 2-propynyl sulfite, ethyl 2-propynyl sulfite, di(2-propynyl)oxalate, methyl 2-propynyl oxalate and ethyl 2-propynyl oxalate (compounds represented by the general formula (VI)). Use of these alkyne compounds in conjunction with an ethylene carbonate derivative is most effective for the improvement of charging and discharging characteristics as well as battery characteristics such as prevention of gas generation.

When the content of at least one alkyne derivative represented by the general formulas (II) to (VII) in a nonaqueous electrolytic solution is excessively small, a satisfactory coating is not formed and, therefore, the desired battery characteristics cannot be obtained. When the content is excessively large, the conductivity of the electrolytic solution may be apt to be changed to cause deterioration of the battery characteristics. Thus, the content is 0.01 to 10% by weight, preferably 0.05 to 5% by weight, more preferably 0.1 to 3% by weight, based on the weight of the nonaqueous electrolytic solution.

The mixing ratio [(the ethylene carbonate derivative):(the alkyne derivative)] (weight ratio) of the ethylene carbonate derivative to the alkyne derivative is 96:4 to 25:75, preferably 90:10 to 40:60, more preferably 80:20 to 50:50.

The pentafluorophenyloxy compound used in the present invention is represented by the following general formula (X):

[Formula 7]

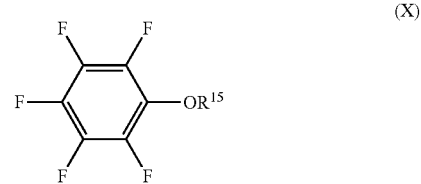

(X)

In the formula (X), $R^{15}$ represents a $C_2$ to $C_{12}$, preferably $C_2$ to $C_5$ alkylcarbonyl group, a $C_2$ to $C_{12}$, preferably $C_2$ to $C_5$ alkoxycarbonyl group, a $C_7$ to $C_{18}$ aryloxycarbonyl group or a $C_1$ to $C_{12}$, preferably $C_2$ to $C_5$ alkanesulfonyl group with the proviso that at least one of the hydrogen atoms of $R^{15}$ may be each substituted with a halogen atom or a $C_6$ to $C_{16}$ aryl group.

As the $C_2$ to $C_{12}$ alkylcarbonyl group, there may be mentioned linear substituents such as a methylcarbonyl group, an ethylcarbonyl group, a propylcarbonyl group, a butylcarbonyl group, a pentylcarbonyl group, a hexylcarbonyl group, a heptylcarbonyl group, an octylcarbonyl group, a nonylcarbonyl group, a decylcarbonyl group and a dodecylcarbonyl group, and branched alkylcarbonyl groups such as an isopropylcarbonyl group, a tert-butylcarbonyl group and a 2-ethylhexylcarbonyl group.

Specific examples of alkylcarbonyl groups having at least one hydrogen atom substituted with a halogen atom or a $C_6$ to $C_{18}$ aryl group include a trifluoromethylcarbonyl group, a 1,2-dichloroethylcarbonyl group, a pentafluoroethylcarbonyl group, a heptafluoropropylcarbonyl group and a benzylcarbonyl group. There may be also mentioned an alkylcarbonyl group having a substituent of an unsaturated bond-containing alkyl group such as methylene group ($CH_2=$) and an allyl group ($CH_2=CH-CH_2-$). Specific examples of the substituted alkylcarbonyl group include a vinylcarbonyl group and 1-methylvinylcarbonyl group.

Specific examples of such a pentafluorophenyloxy compound include pentafluorophenyl acetate, pentafluorophenyl propionate, pentafluorophenyl butanoate, pentafluorophenyl trifluoroacetate, pentafluorophenyl pentafluoropropionate, pentafluorophenyl acrylate and pentafluorophenyl methacrylate. Above all, pentafluorophenyl acetate and pentafluorophenyl trifluoroacetate are preferred.

As the $C_2$ to $C_{12}$ alkoxycarbonyl group, there may be mentioned linear substituents such as a methoxycarbonyl group, an ethoxycarbonyl group, a propoxycarbonyl group, a butoxycarbonyl group, a pentyloxycarbonyl group, a hexyloxycarbonyl group, a heptyloxycarbonyl group, an octyloxycarbonyl group, a nonyloxycarbonyl group, a decyloxycarbonyl group and a dodecyloxycarbonyl group, and branched alkoxycarbonyl groups such as an isopropoxycarbonyl group, a tert-butoxycarbonyl group and a 2-ethylhexyloxycarbonyl group.

Specific examples of alkoxycarbonyl groups having at least one hydrogen atom substituted with a halogen atom or a $C_6$ to $C_{18}$ aryl group include a 1-chloroethoxycarbonyl group, a 2-chloroethoxycarbonyl group, a 2,2,2-trifluoroethoxycarbonyl group, a 2,2,2-trichloroethoxycarbonyl group and a benzyloxycarbonyl group.

Specific examples of such a pentafluorophenyloxy compound include methyl pentafluorophenyl carbonate, ethyl pentafluorophenyl carbonate, tert-butyl pentafluorophenyl carbonate, 9-fluorenylmethyl pentafluorophenyl carbonate and 2,2,2-trifluoroethyl pentafluorophenyl carbonate. Of these compounds, methyl pentafluorophenyl carbonate, ethyl pentafluorophenyl carbonate, tert-butyl pentafluorophenyl carbonate and 2,2,2-trifluoroethyl pentafluorophenyl carbonate are preferred. Especially preferred is methyl pentafluorophenyl carbonate.

As the $C_7$ to $C_{18}$ aryloxycarbonyl group, there may be mentioned a phenyloxycarbonyl group and o-, m- or p-tolyloxycarbonyl groups.

Specific examples of a pentafluorophenyloxy compound having such substituents include phenyl pentafluorophenyl carbonate and dipentafluorophenyl carbonate.

As the $C_1$ to $C_{12}$ alkanesulfonyl group, there may be mentioned linear substituents such as a methanesulfonyl group, an ethanesulfonyl group, a propanesulfonyl group, a butanesulfonyl group, a pentanesulfonyl group, a hexanesulfonyl group, a heptanesulfonyl group, an octanesulfonyl group, a nonanesulfonyl group, a decanesulfonyl group and a dodecanesulfonyl group, and branched alkanesulfonyl groups such as a 2-propanesulfonyl group.

Specific examples of the alkanesulfonyl group having at least one hydrogen atom substituted with a halogen atom include a trifluoromethanesulfonyl group and a 2,2,2-trifluoroethanesulfonyl group.

Examples of such a pentafluorophenyloxy compound include pentafluorophenyl methanesulfonate, pentafluorophenyl ethanesulfonate, pentafluorophenyl propanesulfonate, pentafluorophenyl trifluoromethanesulfonate and pentafluorophenyl 2,2,2-trifluoroethanesulfonate. Of these, pentafluorophenyl methanesulfonate, pentafluorophenyl ethanesulfonate, pentafluorophenyl trifluoromethanesulfonate and pentafluorophenyl 2,2,2-trifluoroethanesulfonate are preferred. Especially preferred are pentafluorophenyl methanesulfonate and pentafluorophenyl trifluoromethanesulfonate.

When the content of the pentafluorophenyloxy compound in a nonaqueous electrolytic solution is excessively small, a satisfactory coating is not formed and, therefore, the desired battery characteristics cannot be obtained. When the content is excessively large, the conductivity of the electrolytic solution may be apt to be changed to cause deterioration of the battery characteristics. Thus, the content is 0.01 to 10% by weight, preferably 0.05 to 5% by weight, more preferably 0.1 to 3% by weight, based on the weight of the nonaqueous electrolytic solution.

The mixing ratio [(the pentafluorophenyloxy compound):(the ethylene carbonate derivative)] (weight ratio) of the pentafluorophenyloxy compound to the ethylene carbonate derivative is 2:98 to 95:5, preferably 20:80 to 75:25, more preferably 30:70 to 50:50.

[Nonaqueous Solvent]

As the nonaqueous solvent used in the present invention, there may be mentioned, for example, cyclic carbonates, linear carbonates, esters, sulfur acid esters, ethers, amides, phosphoric esters, sulfones, lactones, nitriles, etc.

As the cyclic carbonate, there may be mentioned EC, PC, butylene carbonate, etc. Particularly, it is most preferred that the solvent contain EC having a high dielectric constant.

As the linear carbonate, there may be mentioned asymmetric carbonates such as methyl ethyl carbonate (MEC), methyl propyl carbonate, methyl butyl carbonate and ethyl propyl carbonate; and symmetric carbonates such as dimethyl carbonate (DMC) and diethyl carbonate (DEC). Asymmetric carbonates which have a low melting point and are effective to obtain low temperature characteristics of batteries are particularly preferred. MEC is most preferred among them.

As the ester, there may be mentioned methyl propionate, methyl pivalate, butyl pivalate, hexyl pivalate and octyl pivalate, etc. As the sulfur acid ester, there may be mentioned 1,3-propanesultone, 1,4-butanediol dimethanesulfonate, glycol sulfite, propylene sulfite, glycol sulfate, propylene sulfate, etc.

As the ether, there may be mentioned tetrahydrofuran, 2-methyl tetrahydrofuran, 1,4-dioxane, 1,2-dimethoxyethane, 1,2-diethoxyethane, 1,2-dibutoxyethane, etc. There may be mentioned dimethylformamide, etc. as the amide; trimethyl phosphate, trioctyl phosphate, etc. as the phosphoric ester; divinylsulfone, etc. as the sulfone; γ-butyrolactone, etc. as the lactone; and acetonitrile, adiponitrile, etc. as the nitrile.

Of the above-described nonaqueous solvents, cyclic carbonates, linear carbonates, esters and sulfur acid esters are preferred. These solvents may be used singly or in arbitrary combination of two or more thereof. Especially preferred is a nonaqueous solvent containing a cyclic carbonate and/or a linear carbonate.

Concretely, a combination of a cyclic carbonate such as EC and PC and a linear carbonate such as MEC and DEC is particularly preferred.

The proportion of the cyclic carbonate and the linear carbonate is preferably such that the volume ratio [(the cyclic carbonate):(the linear carbonate)] of the cyclic carbonate to the linear carbonate is 10:90 to 40:60, preferably 20:80 to 40:60, more preferably 25:75 to 45:55.

Further, it is preferred that a sulfur acid ester compound and/or divinylsulfone be used together with a cyclic carbonate and a linear carbonate. Particularly, it is most preferable to use divinylsulfone together with at least one sulfur acid ester compound selected from 1,3-propanesultone, glycol sulfite and 1,4-butanediol dimethanesulfonate for reasons of good charging and discharging characteristics.

[Electrolyte Salts]

As the electrolyte salt used in the present invention, there may be mentioned, for example, $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(C_2F_6)_3$, $LiPF_3(CF_3)_3$, $LiPF_3(iso\text{-}C_3F_7)_3$ and $LiPF_5(iso\text{-}C_3F_7)$. Above all, particularly preferable electrolyte salts are $LiPF_6$, $LiBF_4$ and $LiN(SO_2CF_3)_2$, and the most preferable electrolyte salt is $LiPF_6$. These electrolyte salts may be employed singly or in combination of two or more thereof.

As the preferable combination of these electrolyte salts, there may be mentioned a combination of $LiPF_6$ and $LiBF_4$, a combination of $LiPF_6$ and $LiN(SO_2CF_3)_2$ and a combination of $LiBF_4$ and $LiN(SO_2CF_3)_2$. Particularly preferred is a combination of $LiPF_6$ and $LiBF_4$.

The electrolyte salts may be mixed at any arbitrary ratio. When $LiPF_6$ is used in combination with other electrolyte salts, the proportion (molar ratio) of said other electrolyte salts relative to all the electrolyte salts is preferably 0.01 to 45%, more preferably 0.03 to 20%, still more preferably 0.05 to 10%, most preferably 0.05 to 5%.

All the electrolyte salts are used by dissolving in the above-described nonaqueous solvent to a concentration of generally 0.1 to 3 M, preferably 0.5 to 2.5 M, more preferably 0.7 to 2.0 M, most preferably 0.8 to 1.4 M.

As a preferred combination of the above-described nonaqueous solvent and the electrolyte salt, there may be mentioned an electrolytic solution composed of a mixed solvent of (i) EC and/or PC and (ii) MEC and/or DEC, and an electrolyte salt of $LiPF_6$ and/or $LiBF_4$.

More specifically, it is preferable to combine a mixed solvent of (i) EC and/or PC and (ii) MEC and/or DEC having a volume ratio [(i):(ii)] of preferably 15:85 to 45:55, more preferably 20:80 to 40:60, particularly preferably 25:75 to 35:65, with an electrolyte salt of $LiPF_6$. It is also preferable to combine the above mixed solvent with $LiPF_6$ and $LiBF_4$, or with an electrolyte salt of $LiPF_6$ and $LiN(SO_2CF_3)_2$.

[Preparation of Nonaqueous Electrolytic Solution]

The electrolytic solution of the present invention may be obtained, for example, by mixing the above-described nonaqueous solvents such as EC, PC and MEC, dissolving therein an electrolyte salt, and further dissolving therein an ethylene carbonate derivative and (A) a triple bond-containing compound such as at least one alkyne derivative represented by the above general formulas (II) to (VII) and/or (B) a pentafluorophenyloxy compound.

In this case, it is preferred that the nonaqueous solvents, ethylene carbonate derivatives, (A) triple bond-containing compounds and/or (B) pentafluorophenyloxy compounds, and other additives used are previously purified to reduce impurities as much as possible to the extent that the productivity is not considerably deteriorated.

By incorporating, for example, air or carbon dioxide in the nonaqueous electrolytic solution of the present invention, the generation of gases due to decomposition of the electrolytic solution may be prevented and the battery characteristics such as cycle property and storage property may be improved.

As the method for incorporating (dissolving) carbon dioxide or air in the nonaqueous electrolytic solution, there may be used (1) a method in which the nonaqueous electrolytic solution is previously contacted with air or a carbon dioxide-containing gas before the solution is poured in the battery; or (2) a method in which after the solution has been poured in the battery, air or a carbon dioxide-containing gas is charged in the battery before or after sealing the battery. It is preferred that the air or carbon dioxide-containing gas contains as little moisture as possible and have a dew point of $-40°$ C. or below, particularly preferably $-50°$ C. or below.

In the nonaqueous electrolytic solution of the present invention, safety of the battery in the case of overcharging can be ensured by further incorporating an aromatic compound thereinto.

As such an aromatic compound, there may be mentioned, for example, the following (a) to (c):

(a) cyclohexylbenzene, a fluorocyclohexylbenzene compound (1-fluoro-2-cyclohexylbenzene, 1-fluoro-3-cyclohexylbenzene, 1-fluoro-4-cyclohexylbenzene), biphenyl;

(b) tert-butylbenzene, 1-fluoro-4-tert-butylbenzene, tert-amylbenzene, 4-tert-butylbiphenyl, 4-tert-amylbiphenyl;

(c) terphenyls (o-, m- and p-), diphenyl ether, 2-fluorodiphenyl ether, 4-diphenyl ether, fluorobenzene, difluorobenzenes (o-, m- and p-), 2-fluorobiphenyl, 4-fluorobiphenyl, 2,4-difluoroanisole, partially hydrogenated terphenyls (1,2-dicyclohexylbenzene, 2-phenylbicyclohexyl, 1,2-diphenylcyclohexane, o-cyclohexylbiphenyl).

Above all, (a) and (b) are preferred. Most preferred is at least one compound selected from cyclohexylbenzene, fluorocyclohexylbenzene compounds (1-fluoro-4-cyclohexylbenzene, etc.), tert-butylbenzene and tert-amylbenzene.

As the combination of two or more kinds of the above-described aromatic compounds, there may be mentioned, for example, the following combinations (d) to (f):

(d) combination of biphenyl with tert-butyl benzene, combination of biphenyl with tert-amylbenzene, combination of cyclohexylbenzene with tert-amylbenzene, combination of cyclohexylbenzene with 1-fluoro-4-tert-butylbenzene, and combination of tert-amylbenzene with 1-fluoro-4-tert-butylbenzene, (e) combination of biphenyl with cyclohexylbenzene, and combination of cyclohexylbenzene with tert-butylbenzene;

(f) combination of biphenyl with fluorobenzene, combination of cyclohexylbenzene with fluorobenzene, combination of 2,4-difluoroanisole with cyclohexylbenzene, combination of cyclohexylbenzene with a fluorocyclohexylbenzene compound, combination of a fluorocyclohexylbenzene compound with fluorobenzene, and combination of 2,4-difluoroanisole with a fluorocyclohexylbenzene compound.

Of the above combinations, those of (d) and those of (e) are preferred, and those of (d) are more preferred. Of the combinations of (d), those including a fluorine-containing compound are particularly preferred. The mixing ratio [(a fluorine-free aromatic compound):(a fluorine-containing aromatic compound)] (weight ratio) of a fluorine-free aromatic compound to a fluorine-containing aromatic compound is preferably 50:50 to 10:90, more preferably 50:50 to 20:80, most preferably 50:50 to 25:75.

A total content of the aromatic compounds is preferably 0.1 to 5% by weight based on the weight of the nonaqueous electrolytic solution.

[Lithium Secondary Battery]

A lithium secondary battery of the present invention comprises a positive electrode, a negative electrode and a nonaqueous electrolytic solution containing an electrolyte salt dissolved in a nonaqueous solvent. Except for the electrolytic solution, there are no limitations with respect to components, such as a positive electrode and a negative electrode. Any various known components may be used.

Thus, for example, as a positive electrode active material, a lithium compound metal oxide containing cobalt, manganese or nickel may be used. Such positive electrode active materials may be used singly or in combination of two or more thereof.

As the lithium compound metal oxide, there may be mentioned, for example, $LiCoO_2$, $LiMn_2O_4$, $LiNiO_2$, $LiCo_{1-x}Ni_xO_2$ (0.01<x<1), $LiCO_{1/3}Ni_{1/3}Mn_{1/3}O_2$ and $LiNi_{1/2}Mn_{3/2}O_4$. These oxides may be used in combination, such as $LiCoO_2$ and $LiMn_2O_4$, $LiCoO_2$ and $LiNiO_2$, or $LiMn_2O_4$ and $LiNiO_2$. Above all, preferably used is a lithium compound metal oxide, such as $LiCoO_2$, $LiMn_2O_4$ and $LiNiO_2$, which can be used with a charge potential of the positive electrode in a fully charged state of at least 4.3 V on Li basis. Lithium compound metal oxides such as $LiCo_{1/3}Ni_{1/3}Mn_{1/3}O_2$ and $LiNi_{1/2}Mn_{3/2}O_4$, which are usable at 4.4 V or higher are more preferred. An element of the lithium compound oxides may be partly substituted with another element. For example, part of Co of $LiCoO_2$ may be substituted by Sn, Mg, Fe, Ti, Al, Zr, Cr, V, Ga, Zn, Cu or the like element.

As a positive electrode active material, a lithium-containing olivine-type phosphate may be also used. Specific examples of such a phosphate include $LiFePO_4$, $LiCoPO_4$, $LiNiPO_4$, $LiMnPO_4$, $LiFe_{(1-x)}M_xPO_4$ (M represents at least one member selected from Co, Ni, Mn, Cu, Zn and Cd and x is $0 \leq x \leq 0.5$) and the like. Above all, $LiFePO_4$ or $LiCoPO_4$ is preferably used as a positive electrode active material for use with a high voltage.

The lithium-containing olivine-type phosphate may be used as a mixture with other positive electrode active material.

The conductive material for the positive electrode is not specifically limited as long as it is an electron conductive material which does not undergo a chemical change. Examples of the conductive material include graphites, such as natural graphite (scaly graphite, etc.) and artificial graphite, and carbon blacks, such as acetylene black, ketjen black, channel black, furnace black, lamp black and thermal black. The graphites and carbon blacks may be used as an appropriate mixture. The amount of the conductive material added to the positive electrode mixture is preferably 1 to 10% by weight, particularly preferably 2 to 5% by weight.

The positive electrode may be manufactured by kneading a positive electrode active material, a conductive material such as acetylene black or carbon black, and a binder such as polytetrafluoroethylene, polyvinylidene fluoride, a styrene-butadiene copolymer, an acrylonitrile-butadiene copolymer, carboxymethyl cellulose and an ethylene-propylene-diene terpolymer to obtain a positive electrode mixture, then rolling the positive electrode material on a collector such as an aluminum foil and a lath board made of a stainless steel, and then subjecting the resulting assembly to a heat treatment at a temperature of about 50 to 250° C. for about 2 hours under vacuum.

As the negative electrode (negative electrode active material), there may be used a lithium metal, a lithium alloy, a carbon material capable of occluding and releasing lithium (thermally decomposed carbon materials, cokes, graphites (such as artificial graphite and natural graphite), fired organic polymer bodies, and carbon fibers), tin, a tin compound, silicon or a silicon compound. These materials may be used singly or in combination of two or more thereof. At least part of the carbon material may be replaced with tin, a tin compound, silicon or a silicon compound so that the battery capacity can be increased.

Above all, a carbon material is preferred. More preferred is a carbon material having a graphite crystal structure in which the lattice spacing ($d_{002}$) of the lattice face (002) is 0.340 nm or less, particularly 0.335 to 0.340 nm.

The negative electrode may be manufactured in the same manner as the method for the manufacture of the above-described positive electrode using similar binder and high boiling point solvent.

There are no specific limitations with respect to the structure of the lithium secondary battery. The secondary battery may be a coin-shaped battery, a cylindrical battery, a square-shaped battery or a laminate-type battery, each having a single layered or multi-layered separator.

As a separator for batteries, there can be used a single layered or laminated porous film, woven fabric or non-woven fabric of a polyolefin such as polypropylene and polyethylene.

When an air permeability of a separator for batteries is excessively low, the mechanical strength thereof is reduced, and when it is excessively high, the lithium ion conductivity is lowered and, therefore, the function thereof as a battery separator is insufficient, though the influence of air permeability may vary depending upon the manufacturing conditions for the separator. Thus, the air permeability is preferably 50 to 1000 seconds/100 cc, more preferably 100 to 800 seconds/100 cc, most preferably 300 to 500 seconds/100 cc. The porosity of the separator is preferably 30 to 60%, more preferably 35 to 55%, most preferably 40 to 50% for the reason of improvement of capacity characteristics of the battery.

The thickness of the separator for batteries is preferably 5 to 50 μm, more preferably 10 to 40 μm, most preferably 15 to 25 μm, since satisfactory mechanical strength is ensured and since a higher energy density is obtainable.

In the present invention, it is preferable to control the density of the electrode material layers so as to increase the effect of addition of an ethylene carbonate derivative and (A) a triple bond-containing compound and/or (B) a pentafluorophenyloxy compound. In particular, the density of the positive electrode mixture layer formed on an aluminum foil is preferably 3.2 to 4.0 g/cm$^3$, more preferably 3.3 to 3.9 g/cm$^3$, most preferably 3.4 to 3.8 g/cm$^3$. It may be practically difficult to manufacture a positive electrode mixture layer with a density in excess of 4.0 g/cm$^3$. On the other hand, the density of the negative electrode mixture layer formed on a copper foil is preferably 1.3 to 2.0 g/cm$^3$, more preferably 1.4 to 1.9 g/cm$^3$, most preferably 1.5 to 1.8 g/cm$^3$. It may be practically difficult to manufacture a negative electrode mixture layer with a density in excess of 2.0 g/cm$^3$.

When the thickness of the electrode layer is excessively small, the amount of the active material in the electrode material layer is decreased and, thus, the battery capacity is lowered. When the thickness is excessively large, the cycle property and rate characteristics are undesirably lowered. Therefore, the thickness of the electrode layer of the positive electrode (per one side of the collector) is generally 30 to 120 μm, preferably 50 to 100 μm. The thickness of the electrode layer of the negative electrode (per one side of the collector) is generally 1 to 100 μm, preferably 3 to 70 μm.

The lithium secondary battery of the present invention shows a good cycle property for a long period of time even when the final voltage of charge is 4.2 V or higher, particularly 4.3 V or higher. Further, the good cycle property is expected even when the final voltage of charge is 4.4 V or higher. The final voltage of discharge can be set to 2.5 V or higher, and further to 2.8 V or higher. There is no specific limitation with respect to a current value, but a constant current discharge at 0.1 to 3 C is generally adopted. The lithium secondary battery of the present invention may be charged and discharged at −40 to 100° C., preferably 0 to 80° C.

In the present invention, as a measure against an increase of the internal pressure of the lithium secondary battery, a relief valve may be provided on a sealing plate. Else, there may be adopted a method in which a cut is formed in a battery can, gasket or other parts.

In the lithium secondary battery of the present invention, a plural number of the lithium secondary batteries may be accommodated in a battery pack in series and/or in parallel, as necessary. It is preferred that such a battery pack is provided with at least one of a overcurrent protection element, such as a PTC element, a thermal fuse and a bimetal, as well as a safety circuit (a circuit having a function of monitoring the voltage, temperature, current, etc. of each battery and/or the entire battery pack and shutting off the current, as necessary).

EXAMPLES

The present invention will be described below with reference to Examples and Comparative Examples concerning cylindrical batteries. It should be noted, however, that the present invention is not limited to these Examples, in particular, to the combinations of solvents, etc.

Example 1

[Preparation of Nonaqueous Electrolytic Solution]

A nonaqueous solvent of EC:MEC:DEC=3:4:3 (volume ratio) was prepared, in which $LiPF_6$ as an electrolyte salt was dissolved to a concentration of 1 M to obtain a nonaqueous electrolytic solution. To the nonaqueous electrolytic solution were added fluoroethylene carbonate (FEC) to a concentration of 2% by weight and, further, 2-propynyl methyl carbonate as an alkyne derivative to a concentration of 1% by weight based on the final nonaqueous electrolytic solution.

[Manufacture of Lithium Secondary Battery and Measurement of Battery Characteristics]

Ninety-four % by weight of $LiCo_{1/3}Ni_{1/3}Mn_{1/3}O_2$ (positive electrode active material), 3% by weight of acetylene black (conductive material) and 3% by weight of polyvinylidene fluoride (binder) were mixed, to which 1-methyl-2-pyrrolidone as a solvent was further added and mixed. The resulting mixture was applied onto an aluminum foil, dried, compression molded and heat treated to prepare a positive electrode. On the other hand, 95% by weight of artificial graphite (negative electrode active material) were mixed with 5% by weight of polyvinylidene fluoride (binder), to which 1-methyl-2-pyrrolidone as a solvent was further mixed. The resulting mixture was applied onto a copper foil, dried, compression molded and heat treated to prepare a negative electrode.

A cylindrical battery of an 18650 size (diameter: 18 mm, height: 65 mm) was then manufactured by using a microporous polyethylene film separator (thickness: 20 μm), pouring the above electrolytic solution and then trapping air having a dew point of −60° C. before sealing the battery. The battery was provided with a pressure release vent and an internal current breaker (PTC element). At this time, the positive electrode had an electrode density of 3.5 g/cm$^3$, while the negative electrode had an electrode density of 1.6 g/cm$^3$. The electrode layer of the positive electrode had a thickness (per one side of the collector) of 70 μm, while the electrode layer of the negative electrode had a thickness (per one side of the collector) of 60 μm.

The thus obtained 18650 battery was charged at a constant electric current of 2.2 A (1 C) at ambient temperature (20° C.) to a voltage of 4.2 V. The charging was thereafter continued for 3 hours in total under a constant voltage with a final voltage of 4.2 V. Next, the battery was discharged at a constant electric current of 2.2 A (1 C) to a final voltage of 3.0 V. The charge-discharge cycle was repeated. The initial charge-discharge capacity was almost the same as that of a case in which neither the ethylene carbonate derivative nor the triple bond-containing compound was used (Comparative Example 1). The battery characteristics after 200 cycles were measured to reveal that the discharge capacity retention, when the initial discharge capacity was 100%, was 82.8%. The results are summarized in Table 1.

Examples 2 to 9

Examples 2 to 9 were conducted in the same manner as described in Example 1 except that alkyne derivatives shown in Table 1 were used in predetermined amounts in place of 2-propynyl methyl carbonate. The results are also summarized in Table 1.

Example 10

Example 10 was conducted in the same manner as described in Example 1 except that, after the same nonaqueous electrolytic solution as that in Example 1 had been prepared, vinylethylene carbonate (VEC) and di(2-propynyl) sulfite were added thereto in amounts of 2% by weight and 0.5% by weight, respectively, based on the final nonaqueous electrolytic solution. The results are summarized in Table 1.

Examples 11 and 12

Examples 11 and 12 were conducted in the same manner as described in Example 1 except that the positive electrodes (positive electrode active materials) shown in Table 1 were used in place of $LiCo_{1/3}Ni_{1/3}Mn_{1/3}O_2$ and that the alkyne derivatives shown in Table 1 were used in an amount of 0.5% by weight based on the final nonaqueous electrolytic solution. The results are summarized in Table 1.

Comparative Example 1

Comparative Example 1 was conducted in the same manner as described in Example 1 except that, after the same nonaqueous electrolytic solution as that in Example 1 had been prepared, neither FEC nor the alkyne derivative was used. The results are summarized in Table 1.

Comparative Examples 2 to 5

Comparative Examples 2 to 5 were conducted in the same manner as described in Example 1 except that the conditions shown in Table 1 were adopted for the nonaqueous electrolytic solutions. The results are summarized in Table 1.

TABLE 1

| | | Positive Electrode | EC Derivative (wt %) | Alkyne Derivative (wt %) | Composition of Electrolytic Solution (volume raio) | Initial Discharge Capacity (relative value) | Discharge Capacity Retention after 200 Cycles (%) |
|---|---|---|---|---|---|---|---|
| Example | 1 | $LiCo_{1/3}Ni_{1/3}Mn_{1/3}O_2$ | FEC (2) | 2-propynyl methyl carbonate (1) | 1M $LiPF_6$ EC/MEC/DEC = 3/4/3 | 1.00 | 82.8 |
| | 2 | $LiCo_{1/3}Ni_{1/3}Mn_{1/3}O_2$ | FEC (2) | 2-propynyl methanesulfonate (1) | 1M $LiPF_6$ EC/MEC/DEC = 3/4/3 | 1.01 | 82.9 |

TABLE 1-continued

|  |  | Positive Electrode | EC Derivative (wt %) | Alkyne Derivative (wt %) | Composition of Electrolytic Solution (volume raio) | Initial Discharge Capacity (relative value) | Discharge Capacity Retention after 200 Cycles (%) |
|---|---|---|---|---|---|---|---|
|  | 3 | $LiCo_{1/3}Ni_{1/3}Mn_{1/3}O_2$ | FEC (2) | Methyl 2-propynyl sulfite (1) | 1M $LiPF_6$ EC/MEC/DEC = 3/4/3 | 1.01 | 82.6 |
|  | 4 | $LiCo_{1/3}Ni_{1/3}Mn_{1/3}O_2$ | FEC (2) | 2-butyne-1,4-diol dimethyl carbonate (1) | 1M $LiPF_6$ EC/MEC/DEC = 3/4/3 | 1.00 | 81.5 |
|  | 5 | $LiCo_{1/3}Ni_{1/3}Mn_{1/3}O_2$ | FEC (2) | 2-butyne-1,4-diol dimethanesulfonate (0.5) | 1M $LiPF_6$ EC/MEC/DEC = 3/4/3 | 1.00 | 81.7 |
|  | 6 | $LiCo_{1/3}Ni_{1/3}Mn_{1/3}O_2$ | FEC (2) | 2,4-hexadiyne-1,6-diol dimethyl dicarbonate (1) | 1M $LiPF_6$ EC/MEC/DEC = 3/4/3 | 1.00 | 81.3 |
|  | 7 | $LiCo_{1/3}Ni_{1/3}Mn_{1/3}O_2$ | FEC (2) | Phenylacetylene (0.1) | 1M $LiPF_6$ EC/MEC/DEC = 3/4/3 | 1.00 | 80.8 |
|  | 8 | $LiCo_{1/3}Ni_{1/3}Mn_{1/3}O_2$ | FEC (2) | Dipropargyl carbonate (0.5) | 1M $LiPF_6$ EC/MEC/DEC = 3/4/3 | 1.00 | 81.0 |
|  | 9 | $LiCo_{1/3}Ni_{1/3}Mn_{1/3}O_2$ | FEC (2) | 2-propynyl formate (0.5) | 1M $LiPF_6$ EC/MEC/DEC = 3/4/3 | 1.00 | 80.3 |
|  | 10 | $LiCo_{1/3}Ni_{1/3}Mn_{1/3}O_2$ | VEC (2) | Di(2-propynyl) sulfite (0.5) | 1M $LiPF_6$ EC/MEC/DEC = 3/4/3 | 1.00 | 80.7 |
|  | 11 | $LiCo_{0.995}Zr_{0.005}O_2$ | FEC (2) | Di(1-methyl-2-propynyl) oxalate (0.5) | 1M $LiPF_6$ EC/MEC/DEC = 3/4/3 | 1.00 | 81.4 |
|  | 12 | $LiCoO_2$ | FEC (2) | Ethyl 2-propynyl sulfite (0.5) | 1M $LiPF_6$ EC/MEC/DEC = 3/4/3 | 0.98 | 80.5 |
| Comparative Example | 1 | $LiCo_{1/3}Ni_{1/3}Mn_{1/3}O_2$ | none | none | 1M $LiPF_6$ EC/MEC/DEC = 3/4/3 | 1.00 | 68.4 |
|  | 2 | $LiCo_{1/3}Ni_{1/3}Mn_{1/3}O_2$ | FEC (2) | none | 1M $LiPF_6$ EC/MEC/DEC = 3/4/3 | 0.99 | 69.7 |
|  | 3 | $LiCo_{1/3}Ni_{1/3}Mn_{1/3}O_2$ | VEC (2) | none | 1M $LiPF_6$ EC/MEC/DEC = 3/4/3 | 0.99 | 69.5 |
|  | 4 | $LiCo_{1/3}Ni_{1/3}Mn_{1/3}O_2$ | FEC (2) | Triphenyl phosphate (1) | 1M $LiPF_6$ EC/MEC/DEC = 3/4/3 | 1.00 | 74.3 |
|  | 5 | $LiCo_{1/3}Ni_{1/3}Mn_{1/3}O_2$ | none | 2-propynyl methanesulfonate (1) | 1M $LiPF_6$ EC/MEC/DEC = 3/4/3 | 1.00 | 78.7 |

[Study of Proportion of Additives]

Examples 13 to 16

Examples 13 to 16 were conducted in the same manner as described in Example 1 except that, after the same nonaqueous electrolytic solution as that in Example 1 had been prepared, FEC and 2-butyne-1,4-diol diformate as an alkyne derivative were added thereto in the predetermined amounts shown in Table 2. The results are summarized in Table 2.

[Study of Proportion of Electrolyte Salts]

Examples 17 to 20

Examples 17 to 20 were conducted in the same manner as described in Example 1 except that, a nonaqueous electrolytic solution was prepared by dissolving $LiPF_6$ and $LiBF_4$ as electrolyte salts to the predetermined concentrations shown in Table 3, and that FEC was added thereto in an amount of 2% by weight and, further, predetermined amounts of the alkyne derivative as shown in Table 3 were added thereto. The results are summarized in Table 3.

Example 21

Example 21 was conducted in the same manner as described in Example 17 except that a nonaqueous electrolytic solution was prepared by dissolving $LiPF_6$ and $LiN(SO_2CF_3)_2$ as electrolyte salts to concentrations of 0.9 M and 0.1 M, respectively, and that 2-butyne-1,4-diol diformate as an alkyne derivative was then added thereto in an amount of 1% by weight based on the final nonaqueous electrolytic solution. The results are summarized in Table 3.

TABLE 2

|  |  | Positive Electrode | EC Derivative (wt %) | Alkyne Derivative (wt %) | Composition of Electrolytic Solution (volume ratio) | Initial Discharge Capacity (relative value) | Discharge Capacity Retention after 200 Cycles (%) |
|---|---|---|---|---|---|---|---|
| Example | 13 | $LiCo_{1/3}Ni_{1/3}Mn_{1/3}O_2$ | FEC (5) | 2-butyne-1,4-diol diformate (0.6) | 1M $LiPF_6$ EC/MEC/DEC = 3/4/3 | 1.01 | 81.8 |
|  | 14 | $LiCo_{1/3}Ni_{1/3}Mn_{1/3}O_2$ | FEC (2) | 2-butyne-1,4-diol diformate (1) | 1M $LiPF_6$ EC/MEC/DEC = 3/4/3 | 1.01 | 83.0 |
|  | 15 | $LiCo_{1/3}Ni_{1/3}Mn_{1/3}O_2$ | FEC (1) | 2-butyne-1,4-diol diformate (2) | 1M $LiPF_6$ EC/MEC/DEC = 3/4/3 | 1.01 | 82.7 |
|  | 16 | $LiCo_{1/3}Ni_{1/3}Mn_{1/3}O_2$ | FEC (1) | 2-butyne-1,4-diol diformate (3) | 1M $LiPF_6$ EC/MEC/DEC = 3/4/3 | 1.01 | 82.5 |

TABLE 3

|  | Positive Electrode | EC Derivative (wt %) | Alkyne Derivative (wt %) | Composition of Electrolytic Solution (volume ratio) | Initial Discharge Capacity (relative value) | Discharge Capacity Retention after 200 cycles (%) |
|---|---|---|---|---|---|---|
| Example 17 | $LiCo_{1/3}Ni_{1/3}Mn_{1/3}O_2$ | FEC (2) | Di(2-propynyl) oxalate (0.2) | 0.995M $LiPF_6$ + 0.005M $LiBF_4$ EC/MEC/DEC = 3/4/3 | 1.00 | 83.0 |
| 18 | $LiCo_{1/3}Ni_{1/3}Mn_{1/3}O_2$ | FEC (2) | Di(2-propynyl) oxalate (0.2) | 0.99M $LiPF_6$ + 0.01M $LiBF_4$ EC/MEC/DEC = 3/4/3 | 1.00 | 83.1 |
| 19 | $LiCo_{1/3}Ni_{1/3}Mn_{1/3}O_2$ | FEC (2) | Di(2-propynyl) oxalate (0.2) | 0.95M $LiPF_6$ + 0.05M $LiBF_4$ EC/MEC/DEC = 3/4/3 | 1.00 | 82.3 |
| 20 | $LiCo_{1/3}Ni_{1/3}Mn_{1/3}O_2$ | FEC (2) | Methyl 2-propynyl sulfite (0.5) | 0.8M $LiPF_6$ + 0.2M $LiBF_4$ EC/MEC/DEC = 3/4/3 | 1.00 | 82.1 |
| 21 | $LiCo_{1/3}Ni_{1/3}Mn_{1/3}O_2$ | FEC (2) | 2-butyne-1,4-diol diformate (1) | 0.9M $LiPF_6$ + 0.1M $LiN(SO_2CF_3)_2$ EC/MEC/DEC = 3/4/3 | 1.00 | 82.0 |

[Example of Conjoint Use of Aromatic Compound]

Examples 22 to 26

Examples 22 to 26 were conducted in the same manner as described in Example 1 except that di(2-propynyl)oxalate as an alkyne derivative was used in an amount of 0.2% by weight based on the nonaqueous electrolytic solution and, further, the predetermined amounts of ethylene carbonate derivatives and aromatic compounds shown in Table 4 were added thereto. The results are summarized in Table 4.

In Table 4, TAB means tert-amylbenzene, CHB means cyclohexylbenzene, BP means biphenyl, FCHB means 1-fluoro-4-cyclohexylbenzene and TBB means tert-butyl-benzene.

TABLE 4

|  | Positive Electrode | EC Derivative (wt %) | Alkyne Derivative (wt %) | Composition of Electrolytic Solution (volume ratio) | Initial Discharge Capacity (relative value) | Discharge Capacity Retention after 200 Cycles (%) |
|---|---|---|---|---|---|---|
| Example 22 | $LiCo_{1/3}Ni_{1/3}Mn_{1/3}O_2$ | FEC (1) | Di(2-propynyl) oxalate (0.2) | 1M $LiPF_6$ EC/MEC/DEC = 3/4/3 + TAB 1.5 wt % + CHB 1 wt % | 1.01 | 83.9 |
| 23 | $LiCo_{1/3}Ni_{1/3}Mn_{1/3}O_2$ | FEC (1) | Di(2-propynyl) oxalate (0.2) | 1M $LiPF_6$ EC/MEC/DEC = 3/4/3 + BP 0.2 wt % + CHB 3 wt % | 1.00 | 82.8 |
| 24 | $LiCo_{1/3}Ni_{1/3}Mn_{1/3}O_2$ | FEC (1) | Di(2-propynyl) oxalate (0.2) | 1M $LiPF_6$ EC/MEC/DEC = 3/4/3 + CHB 1 wt % + FCHB 1 wt % | 1.00 | 83.4 |
| 25 | $LiCo_{1/3}Ni_{1/3}Mn_{1/3}O_2$ | FEC (1) | Di(2-propynyl) oxalate (0.2) | 1M $LiPF_6$ EC/MEC/DEC = 3/4/3 + TBB 2 wt % + CHB 1 wt % | 1.00 | 83.1 |
| 26 | $LiCo_{1/3}Ni_{1/3}Mn_{1/3}O_2$ | FEC (1) + VEC (1) | Di(2-propynyl) oxalate (0.2) | 1M $LiPF_6$ EC/MEC/DEC = 3/4/3 + TBB 1 wt % + BP 0.1 wt % | 1.00 | 82.9 |

[Evaluation of Gas Generation]

Examples 27 to 31

A cylindrical battery of an 18650 size was manufactured in the same manner as described in Example 1 except that, after the same nonaqueous electrolytic solution as that in Example 1 had been prepared, predetermined amounts of ethylene carbonate derivatives and alkyne derivatives as shown in Table 5 were added thereto.

The thus obtained 18650 batteries were each charged at a constant electric current of 2.2 A (1 C) at 60° C. to a voltage of 4.2 V. The charging was thereafter continued for 3 hours in total with a final voltage of 4.2 V. Next, the battery was discharged at a constant electric current of 2.2 A (1 C) to a final voltage of 3.0 V. The charge-discharge cycle was repeated. The amount of a gas generated in the batteries after 100 cycles was measured according to the Archimedes method. The results are summarized in Table 5.

Comparative Examples 6 to 8

Comparative Examples 6 to 8 were conducted in the same manner as described in Example 27 using the same nonaqueous electrolytic solutions as those of Comparative Example 1 to 3. The results are summarized in Table 5.

TABLE 5

|  |  | Positive Electrode | EC Derivative (wt %) | Alkyne Derivative (wt %) | Composition of Electrolytic Solution (volume ratio) | Amount of Gas Generated (ml) |
|---|---|---|---|---|---|---|
| Example | 27 | $LiCo_{1/3}Ni_{1/3}Mn_{1/3}O_2$ | FEC (2) | Di(2-propynyl) oxalate (0.3) | 1M $LiPF_6$ EC/MEC/DEC = 3/4/3 | 0.61 |
|  | 28 | $LiCo_{1/3}Ni_{1/3}Mn_{1/3}O_2$ | FEC (2) | 2-propynyl methyl carbonate (1) | 1M $LiPF_6$ EC/MEC/DEC = 3/4/3 | 0.58 |
|  | 29 | $LiCo_{1/3}Ni_{1/3}Mn_{1/3}O_2$ | FEC (2) | 2-propynyl methanesulfonate (1) | 1M $LiPF_6$ EC/MEC/DEC = 3/4/3 | 0.62 |
|  | 30 | $LiCo_{1/3}Ni_{1/3}Mn_{1/3}O_2$ | VEC (2) | Methyl 2-propynyl sulfite (1) | 1M $LiPF_6$ EC/MEC/DEC = 3/4/3 | 0.60 |
|  | 31 | $LiCo_{1/3}Ni_{1/3}Mn_{1/3}O_2$ | FEC (1) + VEC (1) | 2-butyne-1,4-diol diformate (1) | 1M $LiPF_6$ EC/MEC/DEC = 3/4/3 | 0.56 |
| Comparative Example | 6 | $LiCo_{1/3}Ni_{1/3}Mn_{1/3}O_2$ | none | none | 1M $LiPF_6$ EC/MEC/DEC = 3/4/3 | 0.71 |
|  | 7 | $LiCo_{1/3}Ni_{1/3}Mn_{1/3}O_2$ | FEC (2) | none | 1M $LiPF_6$ EC/MEC/DEC = 3/4/3 | 1.03 |
|  | 8 | $LiCo_{1/3}Ni_{1/3}Mn_{1/3}O_2$ | VEC (2) | none | 1M $LiPF_6$ EC/MEC/DEC = 3/4/3 | 1.12 |

Example 32

[Preparation of Nonaqueous Electrolytic Solution]

A nonaqueous solvent of EC:MEC:DEC=3:4:3 (volume ratio) was prepared, in which $LiPF_6$ as an electrolyte salt was dissolved to a concentration of 1 M to obtain a nonaqueous electrolytic solution. To the nonaqueous electrolytic solution were added fluoroethylene carbonate (FEC) to a concentration of 2% by weight and, further, pentafluorophenyl methanesulfonate to a concentration of 1% by weight based on the final nonaqueous electrolytic solution.

[Manufacture of Lithium Secondary Battery and Measurement of Battery Characteristics]

A cylindrical battery of an 18650 size (diameter: 18 mm, height: 65 mm) was manufactured in the same manner as described in Example 1.

The thus obtained 18650 battery was charged at a constant electric current of 2.2 A (1 C) at ambient temperature (20° C.) to a voltage of 4.2 V. The charging was thereafter continued for 3 hours in total under a constant voltage with a final voltage of 4.2 V. Next, the battery was discharged at a constant electric current of 2.2 A (1 C) to a final voltage of 3.0 V. The charge-discharge cycle was repeated. The initial charge-discharge capacity was almost the same as that of a case in which neither the ethylene carbonate derivative nor the pentafluorophenyloxy compound was used (Comparative Example 9). The battery characteristics after 300 cycles were measured to reveal that the discharge capacity retention, when the initial discharge capacity was 100%, was 79.1%. The results are summarized in Table 6.

Examples 33 to 36

Examples 33 to 36 were conducted in the same manner as described in Example 32 except that the positive electrode and pentafluorophenyloxy compound shown in Table 6 were used. The results are summarized in Table 6.

Comparative Example 9

Comparative Example 9 was conducted in the same manner as described in Example 32 except that, after the same nonaqueous electrolytic solution as that in Example 32 has been prepared, neither FEC nor the pentafluorophenyloxy compound was used. The results are summarized in Table 6.

Comparative Examples 10 to 13

Comparative Examples 10 to 13 were conducted in the same manner as described in Example 32 except that the conditions shown in Table 6 were adopted for the nonaqueous electrolytic solutions. The results are summarized in Table 6.

TABLE 6

|  |  | Positive Electrode | Pentafluorophenyloxy Compound (wt %) | EC Derivative (wt %) | Composition of Electrolytic Solution (volume ratio) | Initial Discharge Capacity (relative value) | Discharge Capacity Retention after 300 Cycles (%) |
|---|---|---|---|---|---|---|---|
| Example | 32 | $LiCo_{1/3}Ni_{1/3}Mn_{1/3}O_2$ | Pentafluorophenyl methanesulfonate (1) | FEC (2) | 1M $LiPF_6$ EC/MEC/DEC = 3/4/3 | 1.01 | 79.1 |
|  | 33 | $LiCo_{1/3}Ni_{1/3}Mn_{1/3}O_2$ | Pentafluorophenyl acetate (1) | FEC (2) | 1M $LiPF_6$ EC/MEC/DEC = 3/4/3 | 1.00 | 78.4 |
|  | 34 | $LiCo_{1/3}Ni_{1/3}Mn_{1/3}O_2$ | Methyl pentafluorophenyl carbonate (1) | FEC (2) | 1M $LiPF_6$ EC/MEC/DEC = 3/4/3 | 1.00 | 78.9 |
|  | 35 | $LiCo_{0.995}Zr_{0.005}O_2$ | Pentafluorophenyl methanesulfonate (1) | FEC (2) | 1M $LiPF_6$ EC/MEC/DEC = 3/4/3 | 1.02 | 80.3 |
|  | 36 | $LiCoO_2$ | Pentafluorophenyl methanesulfonate (1) | FEC (2) | 1M $LiPF_6$ EC/MEC/DEC = 3/4/3 | 0.98 | 80.3 |
| Comparative Example | 9 | $LiCo_{1/3}Ni_{1/3}Mn_{1/3}O_2$ | none | none | 1M $LiPF_6$ EC/MEC/DEC = 3/4/3 | 1.00 | 63.5 |
|  | 10 | $LiCo_{1/3}Ni_{1/3}Mn_{1/3}O_2$ | none | FEC (2) | 1M $LiPF_6$ EC/MEC/DEC = 3/4/3 | 0.99 | 65.1 |
|  | 11 | $LiCo_{1/3}Ni_{1/3}Mn_{1/3}O_2$ | none | VEC (2) | 1M $LiPF_6$ EC/MEC/DEC = 3/4/3 | 0.99 | 65.9 |

TABLE 6-continued

| | Positive Electrode | Pentafluorophenyloxy Compound (wt %) | EC Derivative (wt %) | Composition of Electrolytic Solution (volume ratio) | Initial Discharge Capacity (relative value) | Discharge Capacity Retention after 300 Cycles (%) |
|---|---|---|---|---|---|---|
| 12 | $LiCo_{1/3}Ni_{1/3}Mn_{1/3}O_2$ | Triphenyl phosphate (1) | FEC (2) | 1M $LiPF_6$ EC/MEC/DEC = 3/4/3 | 1.00 | 70.2 |
| 13 | $LiCo_{1/3}Ni_{1/3}Mn_{1/3}O_2$ | Pentafluorophenyl methanesulfonate (1) | none | 1M $LiPF_6$ EC/MEC/DEC = 3/4/3 | 1.00 | 75.7 |

[Study of Proportion of Additives]

Examples 37 to 40

Examples 37 to 40 were conducted in the same manner as described in Example 32 except that, after the same nonaqueous electrolytic solution as that in Example 32 had been prepared, FEC and pentafluorophenyl methanesulfonate were added thereto in the amounts shown in Table 7. The results are summarized in Table 7.

2% by weight and, further, pentafluorophenyl methanesulfonate was added thereto in an amount of 1% by weight based on the final nonaqueous electrolytic solution. The results are summarized in Table 8.

Example 45

Example 45 was conducted in the same manner as described in Example 41 except that a nonaqueous electrolytic solution was prepared by dissolving $LiPF_6$ and $LiN(SO_2CF_3)_2$ as electrolyte salts to concentrations of 0.9 M and 0.1 M, respectively, and that FEC was then was added thereto in an amount of 2% by weight and, further, pentafluorophenylmethane sulfonate was added thereto in an amount of 1% by weight based on the final nonaqueous electrolytic solution. The results are summarized in Table 8.

TABLE 7

| | | Positive Electrode | Pentafluorophenyloxy Compound (wt %) | EC Derivative (wt %) | Composition of Electrolytic Solution (volume ratio) | Initial Discharge Capacity (relative value) | Discharge Capacity Retention after 300 Cycles (%) |
|---|---|---|---|---|---|---|---|
| Example | 37 | $LiCo_{1/3}Ni_{1/3}Mn_{1/3}O_2$ | Pentafluorophenyl methanesulfonate (0.1) | FEC (5) | 1M $LiPF_6$ EC/MEC/DEC = 3/4/3 | 1.00 | 77.7 |
| | 38 | $LiCo_{1/3}Ni_{1/3}Mn_{1/3}O_2$ | Pentafluorophenyl methanesulfonate (1) | FEC (2) | 1M $LiPF_6$ EC/MEC/DEC = 3/4/3 | 1.00 | 79.1 |
| | 39 | $LiCo_{1/3}Ni_{1/3}Mn_{1/3}O_2$ | Pentafluorophenyl methanesulfonate (3) | FEC (1) | 1M $LiPF_6$ EC/MEC/DEC = 3/4/3 | 1.00 | 78.2 |
| | 40 | $LiCo_{1/3}Ni_{1/3}Mn_{1/3}O_2$ | Pentafluorophenyl methanesulfonate (5) | FEC (0.5) | 1M $LiPF_6$ EC/MEC/DEC = 3/4/3 | 1.00 | 77.1 |

[Study of Proportion of Electrolyte Salts]

Examples 41 to 44

Examples 41 to 44 were conducted in the same manner as described in Example 32 except that, a nonaqueous electrolytic solution was prepared by dissolving $LiPF_6$ and $LiBF_4$ as electrolyte salts to the predetermined concentrations shown in Table 8, and that FEC was added thereto in an amount of

TABLE 8

| | | Positive Electrode | Pentafluorophenyloxy Compound (wt %) | EC Derivative (wt %) | Composition of Electrolytic Solution (volume ratio) | Initial Discharge Capacity (relative value) | Discharge Capacity Retention after 300 Cycles (%) |
|---|---|---|---|---|---|---|---|
| Example | 41 | $LiCo_{1/3}Ni_{1/3}Mn_{1/3}O_2$ | Pentafluorophenyl methanesulfonate (1) | FEC (2) | 0.99M $LiPF_6$ + 0.01M $LiBF_4$ EC/MEC/DEC = 3/4/3 | 1.00 | 80.0 |
| | 42 | $LiCo_{1/3}Ni_{1/3}Mn_{1/3}O_2$ | Pentafluorophenyl methanesulfonate (1) | FEC (2) | 0.99M $LiPF_6$ + 0.01M $LiBF_4$ EC/MEC/DEC = 3/4/3 | 1.00 | 80.1 |
| | 43 | $LiCo_{1/3}Ni_{1/3}Mn_{1/3}O_2$ | Pentafluorophenyl methanesulfonate (1) | FEC (2) | 0.95M $LiPF_6$ + 0.05M $LiBF_4$ EC/MEC/DEC = 3/4/3 | 1.00 | 80.4 |
| | 44 | $LiCo_{1/3}Ni_{1/3}Mn_{1/3}O_2$ | Pentafluorophenyl methanesulfonate (1) | FEC (2) | 0.8M $LiPF_6$ + 0.2M $LiBF_4$ EC/MEC/DEC = 3/4/3 | 1.00 | 79.2 |
| | 45 | $LiCo_{1/3}Ni_{1/3}Mn_{1/3}O_2$ | Pentafluorophenyl methanesulfonate (1) | FEC (2) | 0.9M $LiPF_6$ + 0.1M $LiN(SO_2CF_3)_2$ EC/MEC/DEC = 3/4/3 | 1.00 | 79.8 |

[Example of Conjoint Use of Aromatic Compound]

Examples 46 to 50

Examples 46 to 50 were conducted in the same manner as described in Example 32 except that pentafluorophenyl methanesulfonate was added in an amount of 0.5% by weight based on the nonaqueous electrolytic solution and, further, the predetermined amounts of ethylene carbonate derivatives and aromatic compounds shown in Table 9 were added thereto. The results are summarized in Table 9.

In Table 9, TAB means tert-amylbenzene, CHB means cyclohexylbenzene, BP means biphenyl, TBB means tert-butylbenzene and FCHB means 1-fluoro-4-cyclohexylbenzene.

TABLE 9

| | | Positive Electrode | Pentafluorophenyloxy Compound (wt %) | EC Derivative (wt %) | Composition of Electrolytic Solution (volume ratio) | Initial Discharge Capacity (relative value) | Discharge Capacity Retention after 300 Cycles (%) |
|---|---|---|---|---|---|---|---|
| Example | 46 | LiCo$_{1/3}$Ni$_{1/3}$Mn$_{1/3}$O$_2$ | Pentafluorophenyl methanesulfonate (0.5) | FEC (1) | 1M LiPF$_6$ EC/MEC/DEC = 3/4/3 + TAB 1.5 wt % + CHB 1 wt % | 1.01 | 81.2 |
| | 47 | LiCo$_{1/3}$Ni$_{1/3}$Mn$_{1/3}$O$_2$ | Pentafluorophenyl methanesulfonate (0.5) | FEC (1) | 1M LiPF$_6$ EC/MEC/DEC = 3/4/3 + BP 0.2 wt % + CHB 3 wt % | 1.01 | 81.3 |
| | 48 | LiCo$_{1/3}$Ni$_{1/3}$Mn$_{1/3}$O$_2$ | Pentafluorophenyl methanesulfonate (0.5) | FEC (1) | 1M LiPF$_6$ EC/MEC/DEC = 3/4/3 + TBB 1 wt % + BP 0.1 wt % | 1.01 | 81.6 |
| | 49 | LiCo$_{1/3}$Ni$_{1/3}$Mn$_{1/3}$O$_2$ | Pentafluorophenyl methanesulfonate (0.5) | FEC (1) | 1M LiPF$_6$ EC/MEC/DEC = 3/4/3 + CHB 1 wt % + FCHB 1 wt % | 1.01 | 81.5 |
| | 50 | LiCo$_{1/3}$Ni$_{1/3}$Mn$_{1/3}$O$_2$ | Pentafluorophenyl methanesulfonate (0.5) | FEC (1) + VEC (1) | 1M LiPF$_6$ EC/MEC/DEC = 3/4/3 + TBB 2 wt % + CHB 1 wt % | 1.01 | 81.1 |

[Evaluation of Gas Generation]

Examples 51 to 54

A cylindrical battery of an 18650 size was manufactured in the same manner as described in Example 1 except that, after the same nonaqueous electrolytic solution as that in Example 1 had been prepared, predetermined amounts of ethylene carbonate derivatives and pentafluorophenyloxy compound as shown in Table 10 were added thereto.

The thus obtained 18650 batteries were each charged at a constant electric current of 2.2 A (1 C) at 60° C. to a voltage of 4.2 V. The charging was thereafter continued for 3 hours in total with a final voltage of 4.2 V. Next, the battery was discharged at a constant electric current of 2.2 A (1 C) to a final voltage of 3.0 V. The charge-discharge cycle was repeated. The amount of a gas generated in the batteries after 300 cycles was measured according to the Archimedes method. The results are summarized in Table 10.

Comparative Examples 14 to 16

Comparative Examples 14 to 16 were conducted in the same manner as described in Example 51 using the same nonaqueous electrolytic solutions as those of Comparative Example 9 to 11. The results are summarized in Table 10.

TABLE 10

| | | Positive Electrode | Pentafluorophenyloxy Compound (wt %) | EC Derivative (wt %) | Composition of Electrolytic Solution (volume ratio) | Amount of Gas Generated (ml) |
|---|---|---|---|---|---|---|
| Example | 51 | LiCo$_{1/3}$Ni$_{1/3}$Mn$_{1/3}$O$_2$ | Pentafluorophenyl methanesulfonate (1) | FEC (2) | 1M LiPF$_6$ EC/MEC/DEC = 3/4/3 | 0.57 |
| | 52 | LiCo$_{1/3}$Ni$_{1/3}$Mn$_{1/3}$O$_2$ | Pentafluorophenyl acetate (1) | FEC (2) | 1M LiPF$_6$ EC/MEC/DEC = 3/4/3 | 0.65 |

TABLE 10-continued

| | | Positive Electrode | Pentafluorophenyloxy Compound (wt %) | EC Derivative (wt %) | Composition of Electrolytic Solution (volume ratio) | Amount of Gas Generated (ml) |
|---|---|---|---|---|---|---|
| | 53 | $LiCo_{1/3}Ni_{1/3}Mn_{1/3}O_2$ | Methyl pentafluorophenyl carbonate (1) | FEC (2) | 1M $LiPF_6$ EC/MEC/DEC = 3/4/3 | 0.64 |
| | 54 | $LiCo_{1/3}Ni_{1/3}Mn_{1/3}O_2$ | Pentafluorophenyl methanesulfonate (1) | VEC (2) | 1M $LiPF_6$ EC/MEC/DEC = 3/4/3 | 0.63 |
| Comparative Example | 14 | $LiCo_{1/3}Ni_{1/3}Mn_{1/3}O_2$ | none | none | 1M $LiPF_6$ EC/MEC/DEC = 3/4/3 | 0.71 |
| | 15 | $LiCo_{1/3}Ni_{1/3}Mn_{1/3}O_2$ | none | FEC (2) | 1M $LiPF_6$ EC/MEC/DEC = 3/4/3 | 1.03 |
| | 16 | $LiCo_{1/3}Ni_{1/3}Mn_{1/3}O_2$ | none | VEC (2) | 1M $LiPF_6$ EC/MEC/DEC = 3/4/3 | 1.12 |

INDUSTRIAL APPLICABILITY

A lithium secondary battery having excellent battery characteristics such as electrical capacity, cycle property and storage property and capable of exhibiting excellent battery performances for a long time can be obtained by using the nonaqueous electrolytic solution of the present invention. The obtained secondary battery may be suitably used as a cylindrical battery, a square-shaped battery, a coin-shaped battery, a laminate-type battery and other types of batteries.

The invention claimed is:

1. A nonaqueous electrolytic solution for a lithium secondary battery, in which an electrolyte salt is dissolved in nonaqueous solvent, comprising:
0.1 to 10% by weight of fluoroethylene carbonate; and
0.05 to 5% by weight of (B) a pentafluorophenyloxy compound represented by the general formula (X):

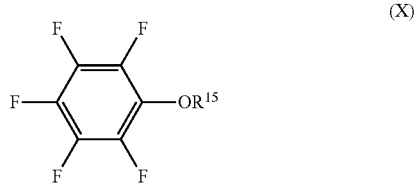

wherein $R^{15}$ represents a $C_2$ to $C_{12}$ alkylcarbonyl group, a $C_2$ to $C_{12}$ alkoxycarbonyl group, a $C_7$ to $C_{18}$ aryloxycarbonyl group or a $C_1$ to $C_{12}$ alkanesulfonyl group, wherein at least one of the hydrogen atoms of $R^{15}$ is optionally-substituted with a halogen atom or a $C_6$ to $C_{18}$ aryl group,
wherein the mixing ratio [((B) the pentafluorophenyloxy compound):(fluorothylene carbonate)] (weight ratio) of (B) the pentafluorophenyloxy compound to fluorothylene carbonate is 2:98 to 95:5.

2. The nonaqueous electrolytic solution according to claim 1, wherein (B) the pentafluorophenyloxy compound comprises at least one compound selected from pentafluorophenyl methanesulfonate, pentafluorophenyl ethanesulfonate, pentafluorophenyl propanesulfonate, pentafluorophenyl trifluoromethanesulfonate and pentafluorophenyl 2,2,2-trifluoroethanesulfonate.

3. The nonaqueous electrolytic solution according to claim 1, wherein the nonaqueous solvent comprises a cyclic carbonate and a linear carbonate.

4. The nonaqueous electrolytic solution according to claim 3, wherein the linear carbonate comprises at least one asymmetrical carbonate selected from methyl ethyl carbonate, methyl propyl carbonate, methyl butyl carbonate and ethyl propyl carbonate.

5. The nonaqueous electrolytic solution according to claim 4, wherein the asymmetrical carbonate is methyl ethyl carbonate.

6. The nonaqueous electrolytic solution according to claim 1, wherein the electrolyte salt comprises $LiPF_6$ and other electrolyte salts, and the proportion (molar ratio) of said other electrolyte salts relative to all the electrolyte salts is 0.01 to 45%.

7. A lithium secondary battery comprising a positive electrode, a negative electrode, and a nonaqueous electrolytic solution which includes an electrolyte salt dissolved in a nonaqueous solvent, wherein the nonaqueous electrolytic solution comprising the nonaqueous electrolytic solution according to claim 1.

8. The lithium secondary battery according to claim 7, wherein the positive electrode is made of a material containing a lithium compound metal oxide and the negative electrode is made of a material containing graphite.

* * * * *